(12) United States Patent
Eberhart et al.

(10) Patent No.: US 6,516,309 B1
(45) Date of Patent: Feb. 4, 2003

(54) METHOD AND APPARATUS FOR EVOLVING A NEURAL NETWORK

(75) Inventors: Russell C. Eberhart, Indianapolis, IN (US); Yuhui Shi, Indianapolis, IN (US)

(73) Assignee: Advanced Research & Technology Institute, Indianapolis, IN (US)

( * ) Notice: Subject to any disclaimer, the term of this patent is extended or adjusted under 35 U.S.C. 154(b) by 0 days.

(21) Appl. No.: 09/353,743

(22) Filed: Jul. 14, 1999

Related U.S. Application Data

(60) Provisional application No. 60/093,241, filed on Jul. 17, 1998.

(51) Int. Cl.[7] .............................................. G06F 15/18
(52) U.S. Cl. .......................................... 706/27; 706/14
(58) Field of Search ............................. 706/27, 14, 19, 706/25; 709/206; 707/2; 382/157, 232, 158; 713/600

(56) References Cited

U.S. PATENT DOCUMENTS

| | | | | |
|---|---|---|---|---|
| 5,014,219 A | * | 5/1991 | White | 706/25 |
| 5,040,214 A | * | 8/1991 | Grossberg et al. | 704/240 |
| 5,142,590 A | * | 8/1992 | Carpenter et al. | 382/157 |
| 5,311,601 A | * | 5/1994 | Carpenter et al. | 382/158 |
| 5,724,567 A | * | 3/1998 | Rose et al. | 707/2 |
| 5,742,739 A | * | 4/1998 | Albasano et al. | 706/14 |
| 5,748,783 A | * | 5/1998 | Rhoads | 382/232 |
| 5,774,357 A | * | 6/1998 | Hoffberg et al. | 713/600 |
| 5,835,901 A | * | 11/1998 | Duvoisin, III et al. | 706/19 |
| 5,875,108 A | * | 2/1999 | Hoffberg et al. | 700/17 |
| 5,920,477 A | * | 7/1999 | Hoffberg et al. | 382/181 |

OTHER PUBLICATIONS

"A Weight Evolution Algorithm for Multi–Layered Network," S. H. Leung, Andrew Luk, and S. C. Ng, Department of Electronic Engineering City Polytechnic of Hong Kong, 0–7803–1901–X/94 IEEE (1994).*

"A Two–Layer Recurrent Neural Network for Kinematic Control of Redundant Manipulations," Jun Wang, Qingni Hu, Dan–chi Jiang, Department of Mechanical & Automation Engineering Chinese University of Hong Kong, 0–7803–3970–8/97 IEEE (1997).*

A New Methodology for Reducing Brittleness in Genetic Programming, Frank W. Moore; Dr. Oscar N. Garcia; CH36015–07/0000–0757, IEEE (1997).*

(List continued on next page.)

Primary Examiner—Thomas Black
Assistant Examiner—Michael B. Holmes
(74) Attorney, Agent, or Firm—Maginot, Moore & Bowman

(57) ABSTRACT

A method of evolving a neural network that includes a plurality of processing elements interconnected by a plurality of weighted connections includes the step of obtaining a definition for the neural network by evolving a plurality of weights for the plurality of weighted connections, and evolving a plurality of activation function parameters associated with the plurality of processing elements. Another step of the method includes determining whether the definition for the neural network may be simplified based upon at least one activation function parameter of the plurality of activation function parameters. Yet another step of the method includes updating the definition for the neural network in response to determining that the definition for the neural network may be simplified. The method utilizes particle swarm optimization techniques to evolve the plurality of weights and the plurality of activation parameters. Moreover, the method simplifies activation functions of processing elements in response to corresponding activation parameters meeting certain criteria, and removes processing elements from the definition of the neural network in response to corresponding activation parameters satisfying certain criteria. Various apparatus are also disclosed for implementing network evolution and simplification.

20 Claims, 7 Drawing Sheets

OTHER PUBLICATIONS

Learning Control for Robot Tasks under Geometric Endpoint Constraints. Suguru Arimoto; and Tomohide Naniwa; Proceeding of the 1992 IEEE International Conference on Ronotics and Automation, 0–8186–2720 IEEE (1992) pp. 1914–1919.*

A Learning Strategy for Multilayer Neural Network Using Discretized Sigmoidal Function, S. Anna Durai; P. V. Siva Prasad; A. Balasubramaniam; V. Ganapathy; 0–7803–2768, IEEE (1995) pp. 2107–2110.*

Regression Modeling in Back–Propagation and Profection Pursuit Learning, Jeng–Neng Hwang; Shyh–Rong Lay; Martin Maechier; R. Douglas Martin; James Schimert; IEEE Transactions on Neural Networks, vol. 5, No. 3 May (1994).*

NN's and GA's: Evolving co–operative behavior in adaptive learning agents, Mukesh J. Patel; and Vittorio Maniezzo; 0–7803–1899 IEEE (1994) pp. 290–295.*

Emergence of Learning Rule in Neural Networks Using Genetic Programming Combined with Decision Trees, Noboru Matsumoto; and Eiichiro Tazaki; 0–7803–4778 IEEE (1998) pp. 1801–1805.*

Feedforward Neural Networks Configuration Using Evolutionary Programming, Manish Sarkar; and B. Yennanarayana; 0–7803–4122 IEEE (1997) pp. 438–443.*

Evolutionary Artificial Neural Networks for Competitive Learning, A.D. Brown; and H.C. Card; 0–7803–4122 IEEE (1997) pp. 1558–1562.*

Weight Evolution Algorithm with Dynamic Offset Range, S.C. Ng; S.H. Leung; and A. Luk; 0–7803–4122, IEEE (1997) pp. 1093–1096.*

Motion Estimation Using a Fuzzy Neural Network, A. Bouzerdoum; A.Z. Kouzani; and M.J. Liebelt; 0–7803–2559 IEEE (1995) pp. 4632–4637.*

Evolving a Nueral Network, K.J. Hintz; and J.J. Spofford; TH0333–5/90/0000/0479, IEEE (1990) pp. 479–484.*

Genetic Evolution of the Topology and Weight Distribution of Neural Networks, Vittorio Maniezzo; IEEE Transactions on Neural Networks, vol. 5, No. 1, IEEE (1994) pp. 39–53.*

Genetic Generation of Both the Weights and Architecture for a Neural Network, John R. Koza; and James P. Rice; 0–7803–0164 IEEE (1991) pp. 397–404.*

A Neural Model of Image Velocity Encoding, K.N. Grney; and M.J. Wright; 0–7803–0164 IEEE (1991).*

A New Evolutionary System for Evolving Artificial Neural Networks, Xin Yao; Yong Liu; IEEE Transactions on Neural Networks, vol. 8, No. 3, May 1997, pp. 694–713.*

*Networks for Approximation and Learning*; Proceeding of the IEEE, Sep. 1990, vol. 78., No. 9, pp. 1481–1497; Authored by Tomaso Poggio and Federico Girosi.

*The Use of Multiple Measurement in Taxonomic Problems*; Authored by R. A. Fisher (1936); pp. 179–188.

*Combinations of Genetic Alforithms and Neural Networks: A Survey of the State of the Art* (1992); pp. 1–37.

Genetic Generation of Both the Weights and Architecture for a Neural Network (1991); Authored by John R. Koza and James P. Rice; pp. 397–404.

The particle swarm: Social adaptation of knowledge (1997); Authored by James Kennedy; pp. 303–308.

A. Discrete Binary Version of the Particle Swarm Algorithim; Authored by James Kennedy and Russel L C. Eberhart.

Particle Swam Optimization (1995); Authored by James Kennedy and Russell Eberhart.

A Modified Partical Swarm Optimizer (1998); Authored by Yuhui Shi and Russell Eberhart.

The Behavior of Particles (1998); Authored by James Kennedy.

A New Optimizer Using Particle Swarm Theory (1995); Authored by Russell Eberhart.

*Evolutionary Artificial Neural Networks*; Encyclopedia of Computer Science and Technology, 1995; vol. 33, Supplement 18; Authored by Allen Kent and James G. Williams.

*Computational Intelligence PC Tools*; Published by AP Professional, Authored by Russ Eberhart, Pat Simpson and Roy Dobbins, Copyright 1996.

* cited by examiner

METHOD AND APPARATUS FOR EVOLVING A NEURAL NETWORK

This application claims the benefit of U.S. Provisional Application Ser. No. 60/093,241 filed Jul. 17, 1998.

FIELD OF THE INVENTION

The present invention relates generally to artificial neural networks, and more particularly to a method and apparatus for evolving an artificial neural network.

DEFINITIONS

An artificial neural network (ANN) is used herein to refer to an analysis paradigm that is roughly modeled after the massively parallel structure of a biological neural network such as the human brain. An ANN is typically implemented with many relatively simple processing elements (PEs) that are interconnected by many weighted connections in order to obtain a computational structure that simulates the highly interconnected, parallel computational structure of biological neural networks. Hereinafter, the terms network and neural network are used interchangeably with the term artificial neural network.

The terms neural network topology and topology are used herein to refer to the number of PE layers of a neural network, number of PEs per PE layer of the neural network, and the interconnections between PEs of the neural network.

The term neural network architecture is used herein to refer to the neural network topology, activation functions implemented by the PEs of the neural network, and learning algorithms specified for a neural network.

The term evolutionary computation is used herein to refer to machine learning optimization and classification paradigms that are roughly based on evolutionary mechanisms such as biological genetics and natural selection. The evolutionary computational field includes genetic algorithms, evolutionary programming, genetic programming, and evolution strategies.

A swarm is used herein to refer to a population of interacting elements that collaboratively search through a problem space in order to optimize some global objective. Interactions between relatively local (topologically) swarm elements are often emphasized. Moreover, a swarm tends to have a general stochastic (or chaotic) characteristic that causes swarm elements to move toward a center of mass in the population located on critical dimensions, thus resulting in convergence on an optimum for the global objective of the swarm.

A particle swarm, as used herein, is similar to a genetic algorithm (GA) in that the system is initialized with a population of randomized positions in hyperspace that represent potential solutions to an optimization problem. However, each particle of a particle swarm, unlike a GA, is also assigned a randomized velocity. The particles (i.e. potential solutions) are then "flown" through hyperspace based upon their respective velocities in search of an optimum solution to a global objective.

BACKGROUND OF THE INVENTION

Artificial neural networks and evolutionary computational techniques are effective in solving certain classes of problems. For example, artificial neural networks are good at mapping input patterns to output patterns in such applications as diagnostic systems. Moreover, evolutionary computational techniques are good at optimizing an objective in such applications as scheduling systems. In light of the fact that artificial neural networks and evolutionary computational techniques excel at different classes of problems, engineers and scientists have combined artificial neural networks and evolutionary computational techniques in order to develop hybrid computational tools that are even more effective than either methodology by itself.

For example, in Russ Eberhart, et al., Computational Intelligence PC Tools (1996) a particle swarm technique is described which evolves weights for weighted connections of a neural network. Use of the particle swarm technique has proven to be highly successful and efficient at accurately evolving neural network weights. However, the particle swarm technique described in Computational Intelligence PC Tools does not evolve the activation functions used by PEs of the neural network structure nor does the described particle swarm technique evolve aspects of the neural network topology such as the number of PE's used to implement the neural network. Accordingly, while the described particle swarm technique may successfully train a neural network, a simpler neural network (i.e. fewer PEs and/or less complex activation functions) may be obtainable if the particle swarm technique were extended to evolve additional aspects of the neural network.

A need, therefore, exists for a method and apparatus which evolve neural network weights and other neural network parameters to obtain a simpler neural network than achievable by evolving only neural network weights.

SUMMARY OF THE INVENTION

In accordance with one embodiment of the present invention, there is provided a method of evolving a neural network that includes a plurality of processing elements interconnected by a plurality of weighted connections. One step of the method includes obtaining a definition for the neural network by evolving a plurality of weights for the plurality of weighted connections, and evolving a plurality of activation function parameters associated with the plurality of processing elements. Another step of the method includes determining whether the neural network definition may be simplified based upon at least one activation function parameter of the plurality of activation function parameters. The method also includes the step of updating the definition for the neural network in response to determining that the neural network definition may be simplified.

Pursuant to another embodiment of the present invention, there is provided another method of evolving a neural network that includes a plurality of processing elements interconnected by a plurality of weighted connections. The method includes the step of initializing a swarm of particles in which each particle includes (i) a velocity vector that represents motion of the particle through a hyperspace, and (ii) a position in the hyperspace that represents a plurality of weights for the plurality of weighted connections and a plurality of activation function parameters associated with the plurality of processing elements. The method also includes the step of determining for each particle of the swarm, a fitness value for a respective definition of the neural network that includes the respective plurality of weights defined by the particle and the plurality of activation function parameters defined by the particle. Another step of the method includes determining based upon the fitness values whether termination criteria have been satisfied. Moreover the method includes the steps of updating for the each particle of the swarm, a personal best value and a personal best position based upon the respective fitness value for the each particle, updating for the each particle of the swarm, a local best value and a local best position based upon fitness values associated with a respective group of the particles, and updating for the each particle of the swarm, the position and the velocity vector for the particle based upon the personal best position for the particle, the local best position for the particle, and the velocity vector for the particle. Finally, the method includes the step of repeating the above determining and updating steps until the termination criteria have been satisfied.

Pursuant to yet another embodiment of the present invention, there is provided a computer readable medium for evolving a neural network that includes a plurality of processing elements interconnected by a plurality of weighted connections. The computer readable medium includes code which when executed by a network evolution system causes the network evolution system to obtain a definition for the neural network by evolving a plurality of weights for the plurality of weighted connections, and evolving a plurality of activation function parameters associated with the plurality of processing elements. Moreover, the code of the computer readable medium when executed by the network evolution system further causes the network evolution system to determine whether the neural network definition may be simplified based upon at least one activation function parameter of the plurality of activation function parameters. The code of the computer readable medium when executed by the network evolution system also causes the network evolution system to update the definition for the neural network in response to determining that the neural network definition may be simplified.

Pursuant to a further embodiment of the present invention, there is provided a computer readable medium for evolving a neural network that includes a plurality of processing elements interconnected by a plurality of weighted connections. The computer readable medium includes code which when executed by a network evolution system causes the network evolution system to initialize a swarm of particles in which each particle includes (i) a velocity vector that represents motion of the particle through a hyperspace, and (ii) a position in the hyperspace that represents a plurality of weights for the plurality of weighted connections and a plurality of activation function parameters associated with the plurality of processing elements. The code of the computer readable medium when executed by the network evolution system further causes the network evolution system to determine for each particle of the swarm, a fitness value for a respective definition of the neural network that includes the respective plurality of weights defined by the particle and the plurality of activation function parameters defined by the particle, and determine based upon the fitness values whether termination criteria have been satisfied.

Furthermore, the code of the computer readable medium when executed by the, network evolution system causes the network evolution system to (i) update for the each particle of the swarm, a personal best value and a personal best position based upon the respective fitness value for the each particle, (ii) update for the each particle of the swarm, a local best value and a local best position based upon fitness values associated with a respective group of the particles, and (iii) update for the each particle of the swarm, the position and the velocity vector for the particle based upon the personal best position for the particle, the local best position for the particle, and the velocity vector for the particle. Moreover, the code of the computer readable medium when executed by the network evolution system causes the network evolution system to repeat the above determining and updating actions until the termination criteria have been satisfied.

Pursuant to yet a further embodiment of the present invention, there is provided a network evolution system for evolving a neural network that includes a plurality of processing elements interconnected by a plurality of weighted connections, the network evolution system. The network evolution system includes a network evolver and a network simplifier. The network evolver is operable to obtain a definition for the neural network by evolving a plurality of weights for the plurality of weighted connections, and evolving a plurality of activation function parameters associated with the plurality of processing elements. The network simplifier is operable to (i) determine whether the definition may be simplified based upon at least one activation function parameter of the plurality of activation function parameters, and (ii) update the definition for the neural network in response to determining that the neural network definition may be simplified.

It is an object of the present invention to provide a new and useful method and apparatus for evolving neural networks.

It is also an object of the present invention to provide an improved method and apparatus for evolving neural networks.

It is another object of the present invention to provide a method and apparatus for evolving both connection weights and processing element activation functions of neural networks.

It is yet another object of the present invention to provide a method and apparatus for simplifying a neural network topology.

It is a further object of the present invention to provide a method and apparatus for simplifying processing element activation functions of a neural network architecture.

It is a further object of the present invention to provide a method and apparatus for evolving a neural network that may directly process non-normalized (i.e. raw) data input signals.

The above and other objects, features, and advantages of the present invention will become apparent from the following description and the attached drawings.

DETAILED DESCRIPTION OF EXEMPLARY EMBODIMENTS

Figure 1:
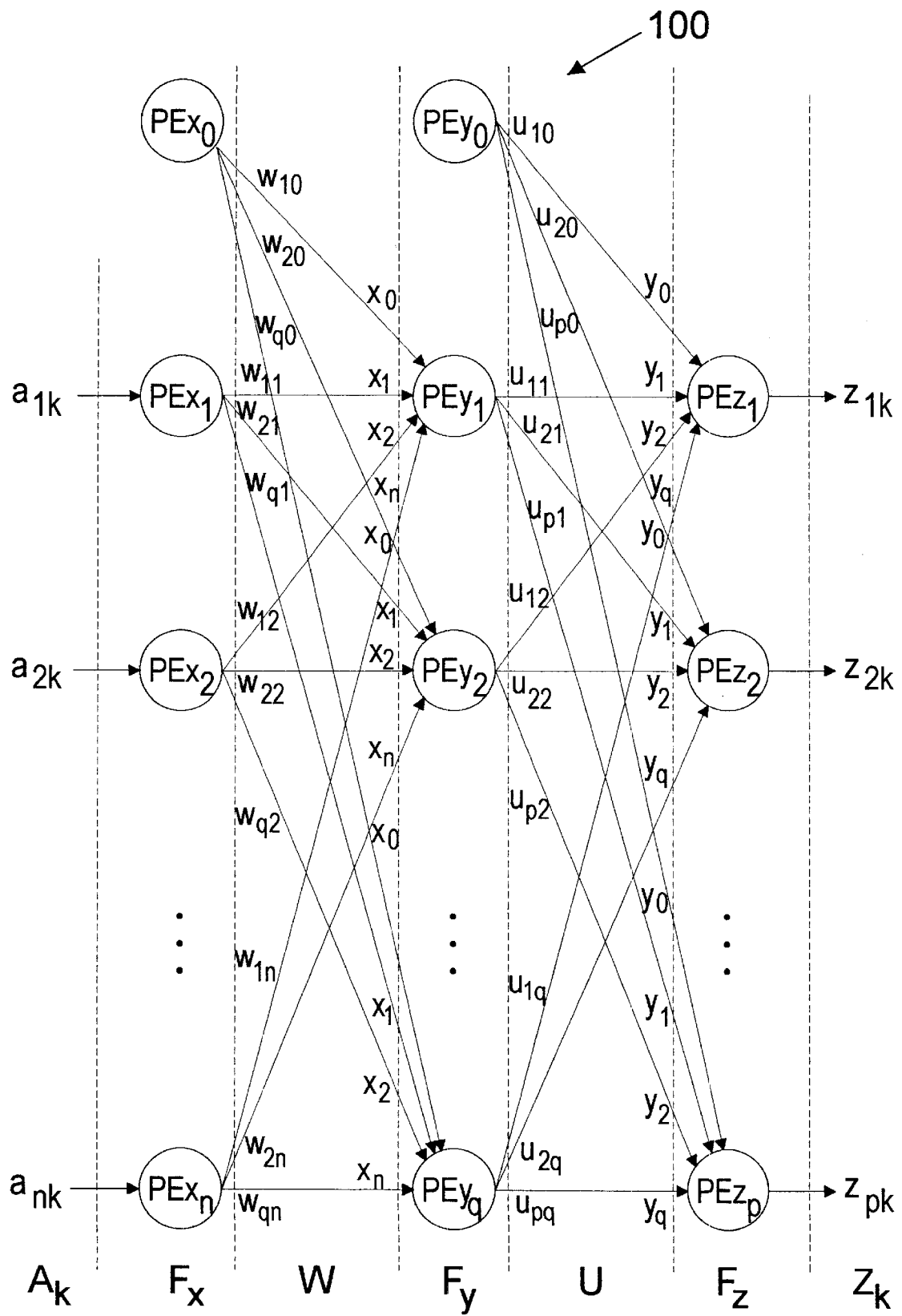
FIG. 1 shows a block diagram of an exemplary neural network.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Exemplary Neural Network

Referring now to FIG. 1, there is illustrated an exemplary neural network 100. As depicted, the neural network 100 includes an input layer $F_x$ of processing elements $PEx_0$, $PEx_1$, ... $PEx_n$, a hidden layer $F_y$ of processing elements $PEy_0$, $PEy_1$, ... $PEy_q$, and an output layer $F_z$ of processing elements $PEz_1$, $PEz_2$, ... $PEz_p$. In general, each processing element $PEx_h$ of the input layer $F_x$ is coupled to each processing element $PEy_i$ of the hidden layer $F_y$ via a matrix of weighted connections W. Moreover, each processing element $PEy_i$ of the hidden layer $F_y$ is coupled to each processing element $PEz_j$ of the output layer $F_z$ via a matrix of weighted connections U.

The exemplary neural network 100 of FIG. 1 is commonly referred to as a fully connected feed-forward neural network since a weighted connection exists between each processing element of adjacent layers and no signal path of the neural network 100 passes through a processing element more than once. While the exemplary neural network 100 is a fully connected feed-forward neural network, it should be appreciated by those skilled in the art that features of the present invention may be applied to sparsely connected neural network topologies, randomly connected neural network topologies, single layer network topologies, and/or feedback neural network topologies.

Referring to FIG. 1 in more detail, the input layer $F_x$ of the neural network 100 includes a biasing processing element $PEx_0$ and input processing elements $PEx_1$, $PEx_2$, ... $PEx_n$. The biasing processing element $PEx_0$ essentially provides an internal bias for each of the hidden processing elements $PEy_1$, $PEy_2$, ... $PEy_q$. To this end, the biasing processing element $PEx_0$ of the input layer $F_x$ is operable to generate a constant output signal $x_0$ (e.g. a signal having a value of 1) which is propagated to the hidden processing elements $PEy_1$, $PEy_2$, ... $PEy_q$ via weighted connections $W_{10}$, $W_{20}$, ... $W_{q0}$ of the weighted connections matrix W.

The input processing elements $PEx_1$, $PEx_2$, ... $PEx_n$ essentially distribute input signals $a_{1k}$, $a_{2k}$, ... $a_{nk}$ of an input pattern $A_k$ to the hidden processing elements $PEy_1$, $PEy_2$, ... $PEy_q$. To this end, each input processing element $PEx_h$ is operable to (i) receive a single input signal $a_{hk}$ of the input pattern $A_k$, and (ii) generate a corresponding output signal $x_h$ which is propagated to the hidden processing elements $PEy_1$, $PEy_2$, ... $PEy_q$ via the weighted connections matrix W. More specifically, each input processing element $PEx_h$ of the exemplary neural network 100 is operable to generate an output signal $x_h$ that is equal to its respective input signal $a_{hk}$. Moreover, the weighted connections $W_{1h}$, $W_{2h}$, ... $W_{qh}$ associated with each input processing element $PEx_h$ are operable to propagate the generated output signal $x_h$ to each of the hidden layer processing elements $PEy_1$, $PEy_2$, ... $PEy_q$.

The hidden layer $F_y$ of the neural network 100 includes a biasing processing element $PEy_0$ and the hidden processing elements $PEy_1$, $PEy_2$, ... $PEy_q$. The biasing processing element $PEy_0$ essentially provides an internal bias for each of the output processing elements $PEz_1$, $PEz_2$, ... $PEz_p$. To this end, the biasing processing element $PEy_0$ of the hidden layer $F_y$ is operable to generate a constant output signal $y_0$ (e.g. a signal having a value of 1) which is propagated to the output processing elements $PEz_1$, $PEz_2$, ... $PEz_p$ via weighted connections $u_{01}$, $u_{02}$, ... $u_{0p}$ of the weighted connections matrix U.

The hidden processing elements $PEy_1$, $PEy_2$, ... $PEy_q$ essentially generate output signals $y_1$, $y_2$, ... $y_q$ that are a function of the received output signals $x_0$, $x_1$, ... $x_n$ and weighted connections W. More specifically, each hidden processing element $PEy_i$ generates an output signal $y_i$ that is a function of the received output vector X (i.e. output signals $x_0$, $x_1$, ... $x_n$) and associated weighted connections vector $W_i$ (i.e weighted connections $w_{i0}$, $w_{i1}$, ... $w_{in}$. Accordingly, each output signal $y_i$ of the hidden processing elements $PEy_1$, $PEy_2$, ... $PEy_q$ may be represented mathematically as follows:

$$y_i = F(X, W_i) \tag{1}$$

where F represents the processing element function which is also commonly referred to as the activation function of the processing element.

In implementing the activation function F, each hidden processing element $PEy_i$ of the exemplary neural network 100 performs a combinatory function c( ) of its corresponding inputs X and $W_i$ and passes the resulting combinatory value c through a threshold function f( ). More specifically, each hidden processing element $PEy_i$ of the exemplary neural network 100 performs a linear combination (i.e. dot product) of its corresponding inputs X and $W_i$ and passes the resulting dot product value c through a sigmoid threshold function. The following hidden layer signal equation (2) represents the output signal $y_i$ as a threshold function f( ) of the combinatory function c( ) where the combinatory function c( ) is implemented as the linear combination of inputs X and $W_i$:

$$y_i = f(c(X, W_i)) = f(X \cdot W_i) = f\left(\sum_{m=0}^{n} x_m w_{im}\right) \tag{2}$$

The following equation (3) represents the sigmoid threshold function used by each hidden processing element $PEy_i$.

$$f(x) = \frac{1}{1 + e^{-\alpha x}} \tag{3}$$

where $\alpha$ represents a slope factor of the sigmoid function that in essence scales the inputs X and $W_i$ of the hidden processing element $PEy_i$.

The output layer $F_z$ of the neural network 100 includes the output processing elements $PEz_1$, $PEz_2$, ... $PEz_p$. The output processing elements $PEz_1$, $PEz_2$, ... $PEz_p$ essentially generate output signals $z_1$, $z_2$, ... $Z_p$ that are a function of the received hidden layer output signals $y_0$, $y_1$, ... $y_q$ and the weighted connections matrix U. More specifically, each output processing element $PEz_j$ generates an output signal $z_j$ that is a function of a received output vector Y (i.e. output signals $y_0$, $y_1$, ... $y_q$) and associated weighted connections vector $U_j$ (i.e. weighted connections $u_{j0}$, $u_{j1}$, ... $u_{jp}$). Accordingly, each output signal $z_j$ of the output processing elements $PEz_1$, $PEz_2$, ... $PEz_p$ may be represented mathematically as follows:

$$z_j = F(Y, U_j) \tag{4}$$

where F represents the activation function of the processing element function.

In implementing the activation function F, each output processing element $PEz_j$ of the exemplary neural network 100 performs a combinatory function c( ) of its corresponding inputs Y and $U_j$ and passes the resulting combinatory value c through a threshold function f( ). More specifically, each output processing element $PEz_j$ of the exemplary neural network 100 performs a linear combination (i.e. dot product) of its corresponding inputs Y and $U_j$ and passes the resulting dot product value c through a sigmoid threshold function. The following output layer signal equation (5) represents the output signal $z_j$ as a threshold function f( ) of the combinatory function c( ) where the combinatory function c( ) is implemented as the linear combination of inputs Y and $U_j$:

$$z_j = f(c(Y, U_j)) = f(Y \cdot U_j) = f\left(\sum_{m=0}^{q} y_m u_{jm}\right) \quad (5)$$

where f( ) represents the above sigmoid threshold function which is presented again with a slope factor of $\beta$ instead of $\alpha$ so that the slope factors $\beta_1, \beta_2: \ldots \beta_p$ of the output processing elements $PEz_1, PEz_2, \ldots PEz_p$ are easily distinguishable from the slope factors 1, $\alpha_2: \ldots \alpha_q$ of the hidden processing elements $PEy_1, PEy_2, \ldots PEy_q$:

$$f(x) = \frac{1}{1 + e^{-\beta x}} \quad (6)$$

During operation, the neural network 100 essentially receives an input pattern $A_k$ and generates a respective output pattern $Z_k$ based upon the processing element activation functions F and weighted connections matrices W and U. More specifically, the input layer $F_x$ receives an input pattern $A_k$ of input signals $a_{1k}, a_{2k}, \ldots a_{nk}$, and generates a corresponding input layer signals $x_1, x_2, \ldots x_n$ that are propagated to the hidden layer $F_y$ via the weighted connections matrix W. Moreover, the input layer $F_x$ generates a biasing signal $x_0$ that is also propagated to the hidden layer $F_y$ via the weighted connections matrix W. The hidden layer $F_y$ then generates hidden layer signals $y_1, y_2, \ldots y_q$ that are based upon the received biasing signal $x_0$, the input layer signals $x_1, x_2, \ldots x_n$, the weighted connections matrix W, and the activation functions F of the hidden processing elements $PEy_1, PEy_2, \ldots PEy_q$. Moreover, hidden layer $F_y$ generates a biasing signal $y_0$ which is propagated along with the hidden layer signals $y_1, y_2, \ldots y_q$ to the output layer $F_z$ via the weighted connections matrix U. The output layer $F_z$ then generates output signals $z_1, z_2, \ldots z_p$ based upon the received biasing signal $y_0$, the hidden layer signals $y_1, y_2, \ldots y_n$, weighted connections matrix U, and the activation functions F of the output processing elements $PEz_1, PEz_2, \ldots PEz_p$.

While the input processing elements $PEx_1, PEx_2, \ldots PEx_n$ of the exemplary neural network 100 essentially implement an identity activation function F( ) that generates an output signal that is equal to a received input signal, the input processing elements $PEx_1, PEx_2, \ldots PEx_n$ may also be implemented in a manner similar to the processing elements of the hidden layer $F_y$ and the output layer $F_z$. Moreover, while the processing elements of the hidden layer $F_y$ and the output layer $F_z$ utilize a linear combination function and a sigmoid threshold function, it should be appreciated by those skilled in the art that the activation functions F( ) of the processing elements may be implemented in several other known manners. More specifically, the activation function F( ) may use a different combinatory function c( ) and pass the combinatory result c through a different threshold function f( ). For example, TABLE 1 discussed below lists several alternatives for the threshold function f( ). Moreover, it should be appreciated that while the exemplary processing elements combine the received signals and pass the result through a threshold function, the activation function F( ) may be implemented in such a manner as to generate an output signal directly from the received signals without first performing a combinatory function of the received inputs.

Exemplary Network Evolution System

Figure 2:
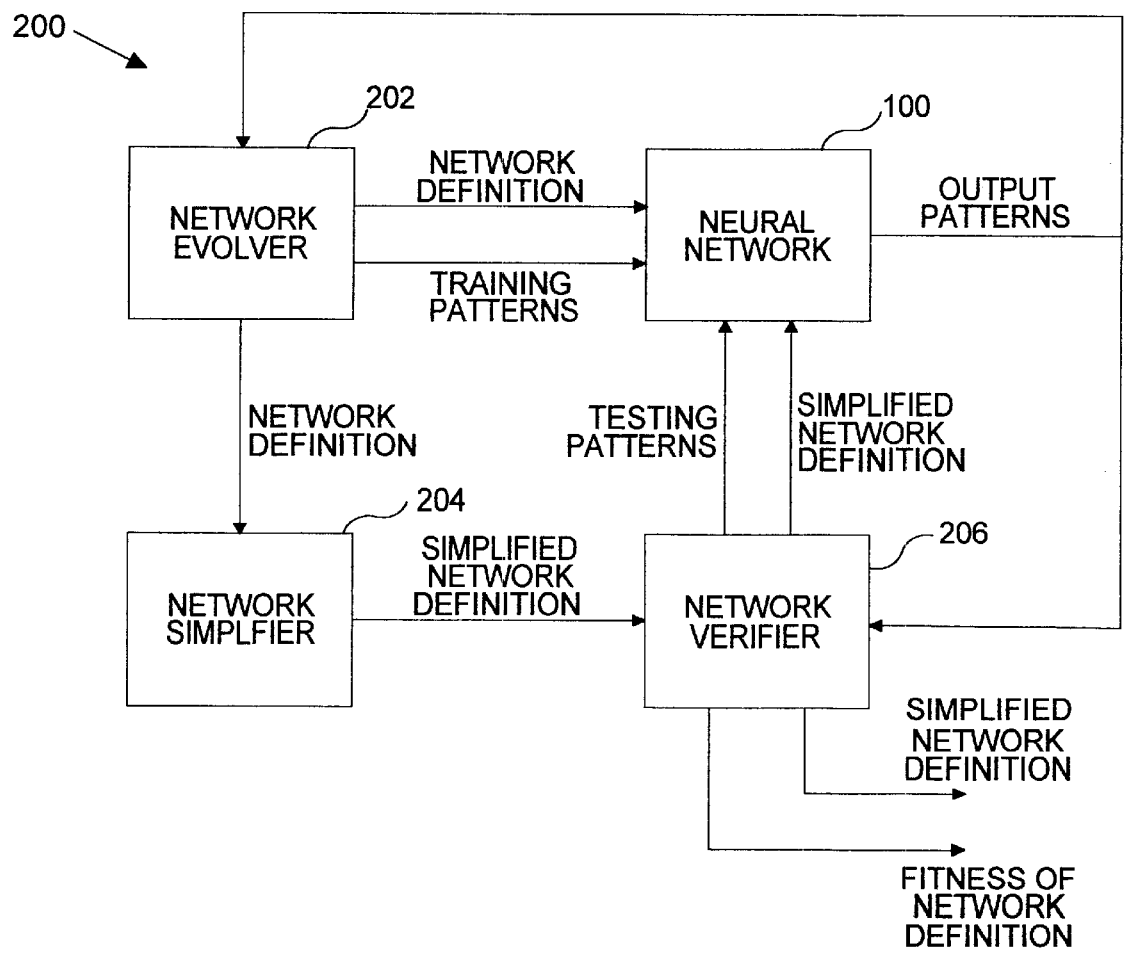
FIG. 2 shows a block diagram of an exemplary network evolution system suitable for evolving parameters of the neural network shown in FIG. 1.

The operation of the neural network 100 is directly related to the connection weights W and U, the activation functions F of the processing elements, and the number of processing elements that implement the neural network 100. Therefore, in order for the neural network 100 to generate appropriate output patterns $Z_k$ from received input patterns $A_k$, the exemplary neural network 100 must have properly defined weighted connections matrices W and U, activation functions F, and processing element layers $F_x$, $F_y$, and $F_z$. To this end, a network evolution system 200 is shown in FIG. 2 that defines and/or evolves these parameters of the exemplary neural network 100 in order to obtain a trained neural network suitable for processing input data patterns $A_k$.

The network evolution system 200 includes a network evolver 202, a network simplifier 204, and a network verifier 206. In general, the network evolver 202 is operable to (i) define an initial neural network architecture for the neural network 100, and (ii) continually adjust the architecture of the neural network 100 until the network evolver 202 obtains a definition for the neural network 100 that meets predefined criteria. More specifically, the network evolver 202 in an exemplary embodiment is operable to (i) apply input patterns $A_k$ of a training pattern set $TRAIN_{SET}$ to the input layer $F_x$ of the neural network 100, and (ii) adjust parameters of the neural network 100 based upon output patterns $Z_k$ generated by the neural network 100 in response to the input patterns $A_k$. As will be explained in more detail in reference to FIG. 3A–3B, the network evolver 202 in an exemplary embodiment includes a particle swarm optimizer which is operable to adjust parameters of the neural network 100 in such a manner so as to achieve a trained neural network 100 that generates appropriate output patterns $Z_k$ in response to processing input patterns $A_k$.

The network simplifier 204 of the network evolution system 200 is generally operable to simplify a definition for the neural network 100. As will be explained in more detail with reference to the network simplification method 400 of FIG. 4, the network simplifier 204 in an exemplary embodiment is operable to (i) receive a definition for the neural network 100 from the network evolver 202, (ii) redefine certain processing elements of the neural network 100 such that the processing element implements a simpler activation function, and (iii) remove unnecessary processing elements from the definition of the neural network 100.

Finally, the network verifier 206 of the network evolution system 200 is generally operable to verify the accuracy of the obtained simplified network definition for the neural network 100. More specifically, the network verifier 206 in an exemplary embodiment is operable to (i) apply input patterns $A_k$ of a test pattern set $TEST_{SET}$ to the input layer $F_x$ of the simplified definition of the neural network 100, and (ii) generate a fitness value that is indicative of how well the trained neural network 100 as defined by obtained simplified definition is able to produce output patterns $Z_k$ in response to processing input patterns $A_k$. In an exemplary embodiment, the network verifier 206 generates the fitness value for the trained neural network by calculating an average sum-squared error between the generated output patterns $Z_k$ and expected patterns $B_k$ of the test pattern set $TEST_{SET}$. (See, below equation (8) for details on performing an average sum-squared error calculation.)

From the produced fitness value for the simplified network definition, the network evolution system 200 is operable to determine whether the neural network 100 has been successfully trained. In particular, the network evolution system 200 in an exemplary embodiment determines that the neural network 100 has been successfully trained if the fitness value (e.g. average sum-squared error) for the simplified definition has a predetermined relationship to (e.g. less than) a fitness threshold value $FIT_{THR}$ (e.g. 0.01).

Exemplary Network Evolution Method

Figure 3A:
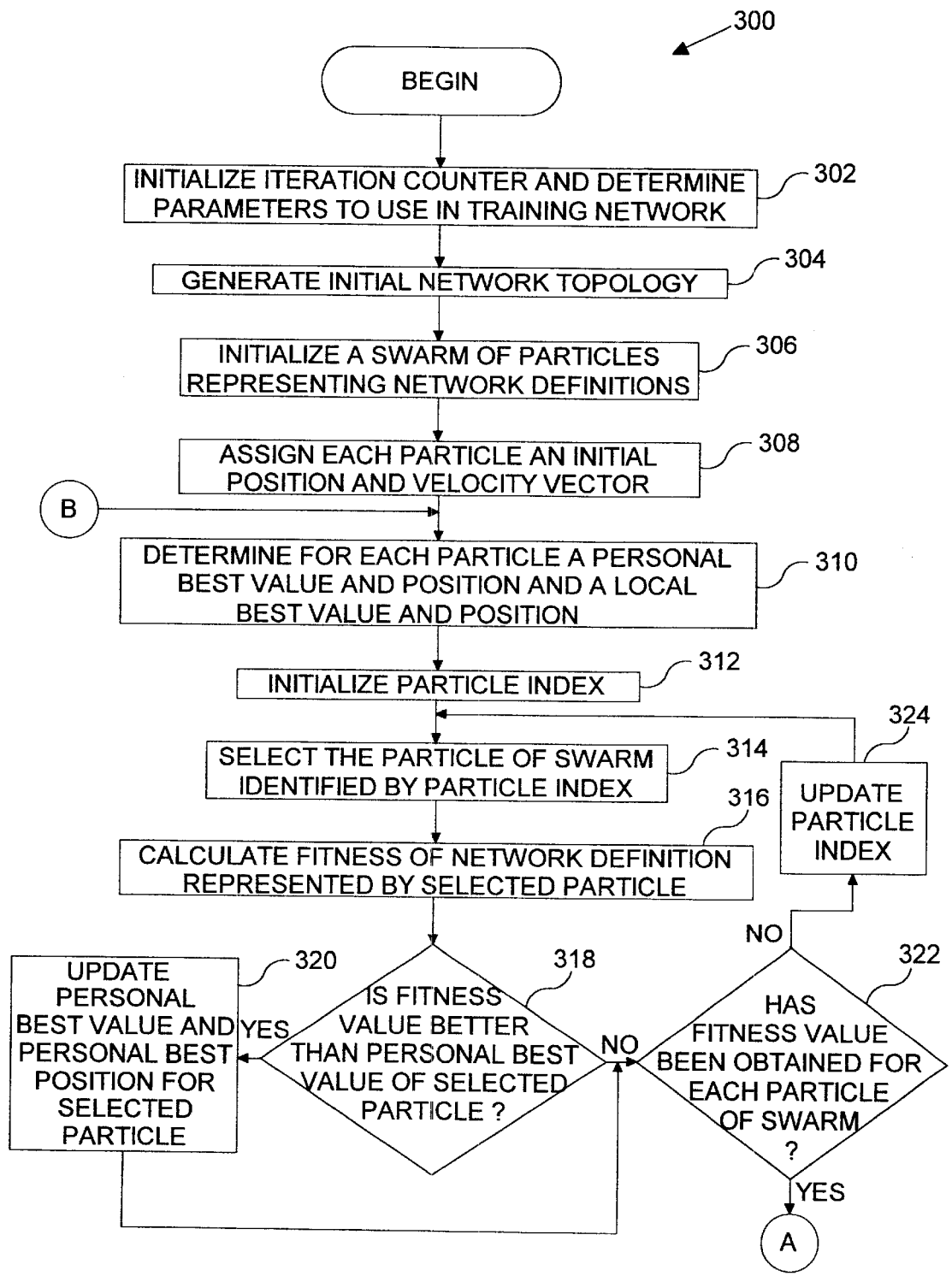
FIGS. 3A–3B show a flowchart of a network evolution method implemented by the exemplary network evolution system of FIG. 2.
Figure 3B:
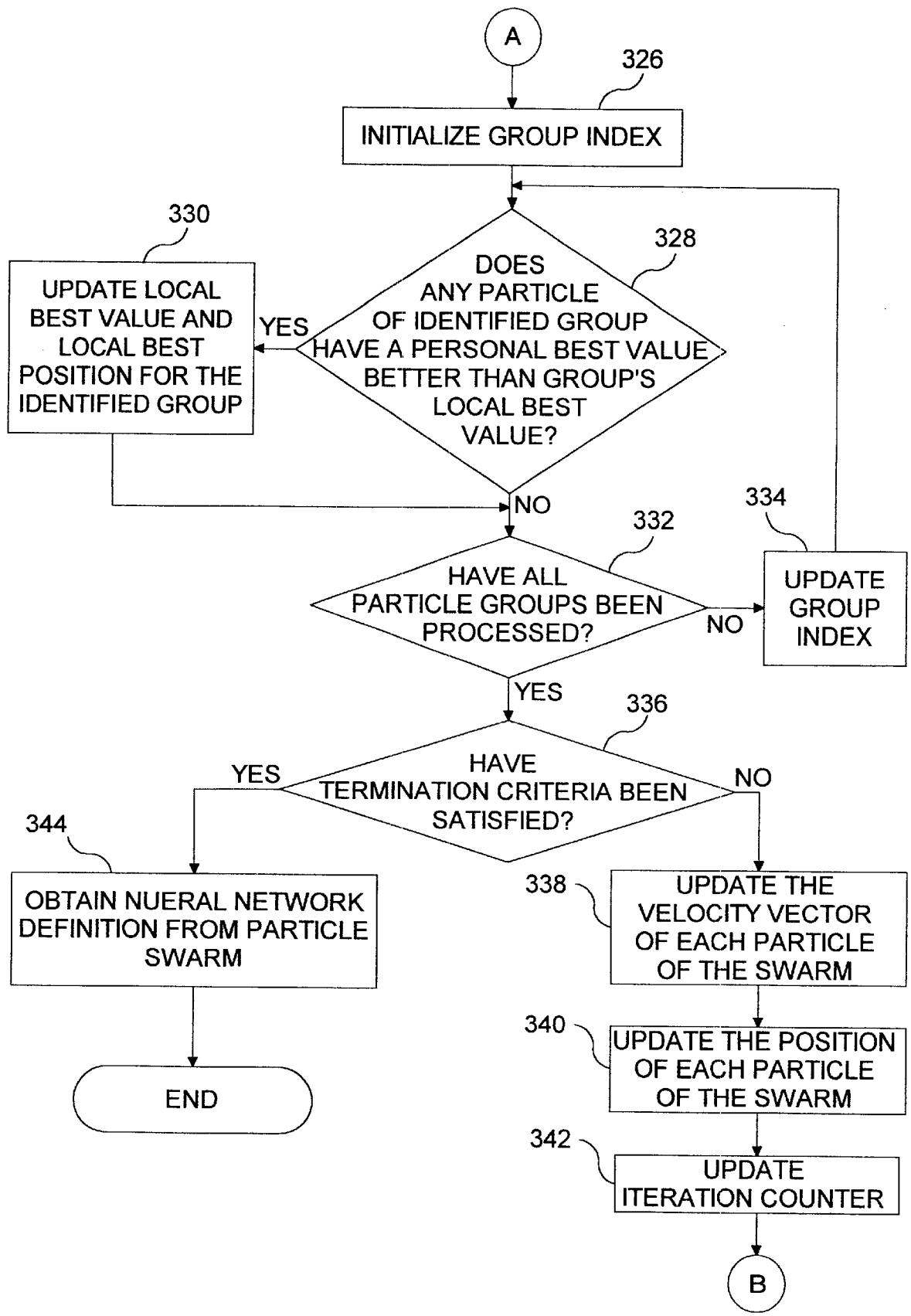

Referring now to FIGS. 3A–3B, a flowchart of a network evolution method 300 that illustrates in detail the operation of the network evolver 202 of the exemplary network evolution system 200. As illustrated in FIGS. 3A–3B, the network evolver 202 begins in step 302 by initializing an iteration counter ITER and determining various parameters to be used in evolving the neural network 100. More specifically, the network evolver 202 in an exemplary embodiment initializes the iteration counter ITER by setting the iteration counter to a value of 1.

Moreover, the network evolver 202 in an exemplary embodiment obtains various parameter values from a configuration file that define (i) a number of particles P# (e.g. 20) for a particle swarm S, (ii) a maximum particle velocity value $V_{MAX}$ (e.g. 10.0), (iii) a maximum position value $POS_{MAX}$ (e.g. 10.0), (iv) a dynamic initial lower limit value $LOWER_0$ (e.g. –0.5), (v) a dynamic initial upper limit value $UPPER_0$ (e.g. 0.5), (vi) a starting inertia weight $wi_0$ (e.g. 0.9), (vii) a slope upper limit $SLOPE_{ULIM}$ (e.g. 90), an error cutoff $E_{CUT}$ (e.g. 0.025), (vii) a maximum number of iterations $ITER_{MAX}$ (e.g. 1000), a training pattern set $TRAIN_{SET}$ (e.g. a file that includes training pairs of input patterns $A_k$ and corresponding expected output patterns $B_k$), a number of pattern pairs PAT# in the training pattern set $TRAIN_{SET}$ (e.g. 500), a testing pattern set $TEST_{SET}$ (e.g. a file that includes testing pairs of input patterns $A_k$ and corresponding expected output patterns $B_k$), and a number of pattern pairs TPAT# in the testing pattern set $TEST_{SET}$ (e.g. 300).

After obtaining the above parameters, the network evolver 202 in step 304 generates an initial topology for the neural network 100. More specifically the network evolver 202 in an exemplary embodiment defines an appropriate three layer, fully connected, feed-forward network topology for the neural network 100. (See, FIG. 1.) To this end, the network evolver 202 determines the number p of output signals $b_{jk}$ that each expected output pattern $B_k$ includes, and the number n of input signals $a_{hk}$ that each input pattern $A_k$ includes. From this information, the network evolver 202 defines an initial topology for the neural network 100 that includes (i) an input layer $F_x$ having a biasing processing element $PEx_0$ and n input processing elements $PEx_h$, (ii) an output layer $F_z$ having p output processing elements $PEz_j$, and (iii) a hidden layer $F_y$ having a biasing processing element $PEy_0$ and q hidden processing elements $PEy_i$.

A suitable number q of hidden processing elements can vary widely according to the application and bears a relationship to the number of statistically significant factors that exist in the input data. If there are too few hidden processing elements $PEy_i$, the network evolver 202 will probably fail to train the neural network 100. If there are just barely enough, the network evolver 202 may successfully train the neural network 100, but the resulting neural network 100 may fail to generate appropriate output patterns $Z_k$ for input patterns $A_k$ that were not part of the training pattern set $TRAIN_{SET}$. Moreover, the resulting neural network 100 will probably not handle noisy data well. Conversely, if there are too many hidden processing elements $PEy_i$, the resulting neural network 100 probably will not generalize very well. In other words, the resulting neural network 100 probably will not generate appropriate output patterns $Z_k$ for input patterns $A_k$ that were not part of the training pattern set $TRAIN_{SET}$.

Accordingly, the neural network may need to be trained several different times with different values of q until a suitable number q of hidden processing elements $PEy_i$ is found. A suitable number q of hidden processing elements $PEy_i$, however, may often be obtained by taking the square root of the number n of input processing elements $PEx_h$ squared plus the number p of output processing elements squared $PEz_j$ plus a few additional processing elements. This relationship for q is represented mathematically by the following equation (7):

$$q = \text{ceil}(\sqrt{\sqrt{n^2 + p^2}}) + o \qquad (7)$$

where n represents the number of input processing elements $PEx_h$, p represents the number of output processing elements $PEz_j$, ceil( ) represents a ceiling function which rounds a non-integer number up to the next integer number, and o represents a small integer with respect to $\text{ceil}(\sqrt{n^2+p^2})$.

In an exemplary embodiment of the present invention, the values n, q, and p are supplied by a user via a configuration file that contains appropriate values for n, q, and p as well as the above discussed parameters. However, it should be appreciated that a user may alternatively supply the values n, q, and p as well as the above discussed parameters via an input device such as a mouse or a keyboard. Accordingly, the network evolver 202 in step 304 may determine appropriate values for n, q and p based upon (i) the input patterns $A_k$ and output pattern $B_k$ of the training pattern set $TRAIN_{SET}$, and/or (ii) user supplied parameters received via an input device and/or configuration file.

After defining an initial network topology for the neural network 100, the network evolver 202 in step 306 initializes a swarm S of particles $P_0, P_1, \ldots P_{p\#}$ that represent P# possible definitions for the neural network 100. More specifically, the network evolver 202 defines for each particle $P_x$ of the swarm S, (i) a position $POS_x$ in D-dimensional hyperspace, and a velocity vector $V_x$ through the D-dimensional hyperspace. More specifically, the network evolver 202 defines the D-dimensional hyperspace for the neural network 100 such that each dimension of the D-dimensional hyperspace represents a weighted connection $w_{hi}$ of the weighted connections matrix W, a weighted connection $u_{ij}$ of the weighted connections matrix U, a slope factor $\alpha_i$ of a slope vector A, or a slope factor $\beta_j$ of a slope vector B.

For example, if the neural network 100 is initially defined to include an (i) input layer $F_x$ having a biasing processing element $PEx_0$ and two input processing elements $PEx_1$, and $PEx_2$, a hidden layer $F_y$ having a biasing processing element $PEy_0$ and four hidden processing elements $PEy_1, PEy_2, \ldots$ and $PEy_4$, and an output layer $F_z$ having a single output processing element $PEz_1$, then the neural network 100 would have a weighted connections matrix W consisting of 12 weighted connections $w_{10}, w_{20}, \ldots w_{40}, w_{11}, w_{21}, \ldots w_{41}, w_{12}, w_{22}, \ldots w_{42}$, a weighted connections matrix U consisting of 5 weighted connections $u_{10}, u_{11}, \ldots u_{14}$, a slope vector A consisting of 4 slope factors $\alpha_1, \alpha_2, \ldots \alpha_4$, and a slope vector B consisting of 1 slope factor $\beta_1$. Therefore, the network evolver 202 in this example, would define a 22-dimensional hyperspace in which each position in the 22-dimensional hyperspace represents a possible solution for the 12 weighted connections of the weighted connections matrix W, the 5 weighted connections of the weighted connection matrix U, the 4 slope factors of the slope vector A, and the 1 slope factor of the slope vector B.

In an exemplary embodiment, the network evolver 202 in step 308 randomly assigns each particle $P_x$ of the particle swarm S an initial position $POS_x$ and velocity vector $V_x$. More specifically, the network evolver 202 randomly assigns the initial positions $POS_1$, $POS_2$, ... $POS_{P\#}$ of the particles $P_1$, $P_2$, ... $P_{P\#}$ such that the weight connections $w_{hi}$ and $u_{ij}$ represented by the positions $POS_1$, $POS_2$, ... $POS_{P\#}$ are between the initial lower limit $LOWER_0$ and initial upper limit $UPPER_0$. Moreover, the network evolver 202 assigns the initial positions $POS_1$, $POS_2$, ... $POS_{P\#}$ of the particles $P_1$, $P_2$, ... $P_{P\#}$ such that the slope factors $\alpha_i$ and $\beta_j$ are initially equal to 1. Furthermore, the network evolver randomly assigns the D-dimensional velocity vectors $V_1$, $V_2$, ... $V_{P\#}$ of the particles $P_1$, $P_2$, ... $P_{P\#}$ such that each dimensional velocity component $v_{x1}$, $v_{x2}$, $v_{xD}$ of a velocity vector $V_x$ is between the initial lower limit $LOWER_0$ and the initial upper limit $UPPER_0$.

After initializing the positions $POS_1$, $POS_2$, ... $POS_{P\#}$ of the particles $P_1$, $P_2$, $P_{P\#}$, the network evolver 202 in step 310 determines a personal best value $PBEST_x$, a personal best position $PBESTX_x$, a local best value $LBEST_x$, and a local best position $LBESTX_x$ for each particle the particles $P_1$, $P_2$, ... $P_{P\#}$. More specifically, each personal best value $PBEST_x$ represents the corresponding best definition obtained by the particle $P_x$ for the neural network 100, and each personal best position $PBESTX_x$ represents the position in hyperspace where the particle $P_x$ obtained its corresponding particle best value $PBEST_x$. Similarly, each local best value $LBEST_x$ represents the corresponding best definition obtained by a particle group $PG_x$ that includes particles $P_{x-L}$, ... $P_{x-1}$, $P_x$, $P_{x+1}$, ... $P_{x+L}$, and each local best position $LBESTX_x$ represents the position in hyperspace where the particle group $PG_x$ obtained its corresponding local best value $LBEST_x$.

In an exemplary embodiment, the particle groups $PG_1$, $PG_2$, ... $PG_{P\#}$ are defined in a circular array fashion based upon a local neighbor parameter L. More specifically, if the local neighbor parameter L is equal to 2 and the number of particles is equal to 20, then the first particle group $PG_1$ would include particles $P_{19}$, $P_{20}$, $P_1$, $P_2$, and $P_3$ and the second particle group $PG_2$ would include the particles $P_{20}$, $P_1$, $P_2$, $P_3$, and $P_4$. It should be appreciated by those skilled in the art that if the local neighbor parameter L is equal to or greater than one-half the number of particles P#, then a single local best value LBEST and corresponding local best position LBESTX may be used since all of the particle groups $PG_1$, $PG_2$, ... $PG_{P\#}$ would include every particle $P_1$, $P_2$, ... $P_{P\#}$ of the particle swarm S. This special case is referred to as a global version of the particle swarm optimizer implemented by the network evolver 202. Moreover, the single local best value LBEST and corresponding local best position LBESTX in this special case are referred to as the global best value GBEST and the global best position GBESTX, respectively.

It has been found that the larger the local neighbor parameter L becomes the quicker (i.e. less iterations) on average the particle swarm optimizer of the network evolver 202 converges to an optimum. However, as the local neighbor parameter L becomes larger, the particle swarm optimizer of the network evolver 202 is more likely to converge on a local optimum instead of a global optimum. In other words, as the local neighbor parameter L becomes larger, the more likely the particle swarm optimizer of the network evolver 202 will fail to obtain a definition for the neural network 100 that achieves a desired level of performance. Accordingly, in an exemplary embodiment, the network evolver 202 utilizes a local neighbor parameter L of 2 which has been found to cause the particle swarm optimizer to converge on a global optimum as opposed to a local optimum at highly successful rate.

In order to determine a particle best value $PBEST_x$ and a particle best position $PBESTX_x$ for each particle $P_x$ of the particle swarm S, the network evolver 202 computes a fitness value $FV_x$ for each definition of the neural network 100 as defined by the particle positions $POS_1$, $POS_2$, ... $POS_{P\#}$. More specifically, the network evolver 202 in an exemplary embodiment calculates a fitness value $FV_x$ for each particle $P_x$ based upon a fitness function FIT( ) of (i) the output patterns $Z_1$, $Z_2$, ... $Z_{PAT\#}$ generated in response to propagating the input patterns $A_1$, $A_2$, ... $A_{PAT\#}$ of the training pattern set $TRAIN_{SET}$ through the neural network 100 as defined by the selected particle $P_x$, and (ii) the corresponding expected output patterns $B_1$, $B_2$, ... $B_{PAT\#}$ of the training pattern set $TRAIN_{SET}$. In an exemplary embodiment of the present invention, the network evolver 202 calculates the fitness value $FV_x$ of a particle $P_x$ based upon the following fitness function FIT( ) which computes the average sum-squared error between the output patterns $Z_1$, $Z_2$, ... $Z_{PAT\#}$ and the expected output patterns $B_1$, $B_2$, ... $B_{PAT\#}$:

$$FV_x = FIT(B, Z) = \frac{0.5 \sum_{k=1}^{PAT\#} \sum_{j=1}^{q} (b_{kj} - z_{kj})^2}{PAT\#} \quad (8)$$

where q represents the number of output processing elements of the neural network output layer $F_z$, $z_{kj}$ represents the output signal of the output processing element $PEz_j$ in response to the input pattern $A_k$ being applied to the neural network input layer $F_x$, $b_{kj}$ represents the corresponding expected output signal of the output processing element $PEz_j$, and PAT# represents the number of patterns of the test pattern set $TRAIN_{SET}$.

To this end of generating fitness values $FV_1$, $FV_2$, ... $FV_{P\#}$ for the particles $FV_1$, $FV_2$, ... $FV_{P\#}$, the network evolver 202 in step 312 initializes a particle index N to a value of 1 in order to cause the particle index N to identify the first particle $P_1$ of the particle swarm S. The network evolver 202 then in step 314 selects the particle $P_N$ identified by the particle index N.

After selecting the particle $P_N$ identified by the particle index N, the network evolver 202 in step 316 calculates a fitness value $FV_N$ for the particle definition of the neural network 100 via the above fitness function FIT( ). In particular, the network evolver 202 in an exemplary embodiment generates output patterns $Z_1$, $Z_2$, ... $Z_{PAT\#}$ in response to applying the input patterns $A_1$, $A_2$, ... $A_{PAT\#}$ of the training pattern set $TRAIN_{SET}$ to a definition of the neural network 100 as defined by the position $POS_N$ of the selected particle $P_N$. More specifically, the network evolver 202 generates the output patterns $Z_1$, $Z_2$, ... $Z_{PAT\#}$ based upon a definition of the neural network 100 in which the neural network 100 has a weighted connections matrix W, a weighted connections matrix U, a slope vector A, and a slope vector B as defined by the position $POS_N$ of the selected particle $P_N$. Moreover, the network evolver 202, in the exemplary embodiment, generates a fitness value $FV_N$ for the selected particle $P_N$ based upon above equation (8) which causes the network evolver 202 to calculate the average sum-squared error between the generated output patterns $Z_1, Z_2, \ldots Z_{PAT\#}$ and the expected output patterns $B_1, B_2, \ldots B_{PAT\#}$ of the test pattern set $TRAIN_{SET}$.

After obtaining the fitness value $FV_N$ for the selected particle $P_N$, the network evolver 202 in step 318 determines whether the personal best value $PBEST_N$ and personal best position $PBESTX_N$ for the selected particle $P_N$ need to be updated. To this end, the network evolver 202 determines whether the obtained fitness value $FV_N$ for the selected particle $P_N$ is better than the current personal best value $PBEST_N$ for the selected particle $P_N$. If the obtained fitness value $FV_N$ for the selected particle $P_N$ is better than the current personal best value $PBEST_N$ for the selected particle $P_N$, then the network evolver 202 proceeds to step 320 in order to update the personal best value $PBEST_N$ and personal best position $PBESTX_N$ for the selected particle $P_N$. Otherwise, if the obtained fitness value $FV_N$ for the selected particle $P_N$ is not better than the current personal best value $PBEST_N$ for the selected particle $P_N$, then the network evolver 202 proceeds to step 322 in order to determine whether a fitness value $FV_x$ has been obtained for each particle $P_x$.

In an exemplary embodiment, the network evolver 202 attempts to minimize the fitness value $FV_x$ (i.e. average sum-squared error) for the neural network 100. Accordingly, in the exemplary embodiment, the network evolver 202 determines that an obtained fitness value $FV_N$ is better than a personal best value $PBEST_N$ if the fitness value $FV_N$ is less than the personal best value $PBEST_N$. However, it should be appreciated that the fitness function FIT( ) may be defined in such a way that the network evolver 202 needs to maximize the fitness values $FV_x$ in order to properly train the neural network 100. Accordingly, in such a maximization environment, the network evolver 202 would determine that the a fitness value $FV_N$ is better than a personal best value $PBEST_N$ if the fitness value $FV_N$ is greater than the personal best value $PBEST_N$. Moreover, it should be appreciated that the fitness functions of equation (8) is merely exemplary and that other fitness functions may be used.

After determining that the fitness value $FV_N$ is better than the personal best value $PBEST_N$ for the selected particle $P_N$, the network evolver 202 in step 320 updates the personal best value $PBEST_N$ and the personal best position $PBESTX_N$ for the selected particle $P_N$. More specifically, the network evolver 202 sets the personal best value $PBEST_N$ equal to the calculated fitness value $FV_N$ for the selected particle $P_N$. Moreover, the network evolver 202 sets the personal best position $PBEST_N$ equal to the position $POS_N$ of the selected particle $P_N$.

It should be noted that in an exemplary embodiment, the personal best values $PBEST_x$ are initially set to poor values so that network evolver 202 during the first iteration through the network evolution method 300 (i.e. iteration counter ITER equal to 1) will update the personal best values $PBEST_N$ with the calculated fitness value $FV_N$ for the selected particle $P_N$.

In step 322, the network evolver 202 determines whether a fitness value $FV_x$ has been obtained for each particle $P_1$, $P_2, \ldots P_{P\#}$ of the particle swarm S. If the network evolver 202 determines that a fitness value $FV_x$ has been obtained for each particle $P_1, P_2, \ldots P_{P\#}$ of the particle swarm S, then the network evolver 202 proceeds to step 326 of the network evolution method 300. However, if the network evolver 202 determines that a fitness value $FV_x$ has not been obtained for each particle $P_1, P_2, \ldots P_{P\#}$ of the particle swarm S, then the network evolver 202 proceeds to step 324 of the network evolution method 300. In an exemplary embodiment of the present invention, the network evolver 202 determines that a fitness value $FV_x$ has been obtained for each particle $P_1$, $P_2, \ldots P_{P\#}$ of the particle swarm S if the particle index N is greater than the number of particles P# included in the particle swarm S.

After determining that a fitness value $FV_x$ has not been obtained for each particle $P_1, P_2, \ldots P_{P\#}$, the network evolver 202 in step 324 updates the particle index N and returns to step 314 in order to select the particle $P_N$ identified by the updated particle index N and obtain a fitness value $FV_N$ for the newly selected particle $P_N$. In an exemplary embodiment, the network evolver 202 updates the particle index N by incrementing the particle index N by a value of 1.

After determining that a fitness value $FV_x$ has been obtained for each particle $P_1, P_2, \ldots P_{P\#}$, the network evolver 202 updates the local best value $LBEST_x$ and local best position $LBESTX_x$ for each particle $P_1, P_2, \ldots P_{P\#}$. To this end, the network evolver 202 in step 326 initializes a group index M to a value of 1 in order to obtain a group index M that identifies a first particle group $PG_1$.

Then, the network evolver 202 in step 328 determines whether any particle $P_{M-L}, \ldots P_{M-1}, P_M, P_{M+1}, \ldots P_{M+L}$ of the identified group $PG_M$ has a personal best value $PBEST_x$ that is better than the current local best value $LBEST_M$ for the identified particle group $PG_M$. If any of the personal best values $PBEST_{M-L}, \ldots PBEST_{M-1}, PBEST_M$, $PBEST_{M+1}, \ldots PBEST_{M+L}$ of the identified group $PG_M$ is better than the current local best value $LBEST_M$ for the identified particle group $PG_M$, then the network evolver proceeds to step 330 in order to update the local best value $LBEST_M$ for the identified particle group $PG_M$. Otherwise, if none of the personal best values $PBEST_{M-L}, \ldots PBEST_{M-1}, PBEST_M, PBEST_{M+1}, \ldots PBEST_{M+L}$ of the identified group $PG_M$ are better than the current local best value $LBEST_M$ for the identified particle group $PG_M$, then the computer system proceeds to step 332 in order to determine whether all particle groups $PG_1, PG_2, \ldots PG_{P\#}$ have been processed.

After determining that at least one personal best value $PBEST_{M-L}, \ldots PBEST_{M-1}, PBEST_M, PBEST_{M+1}, \ldots PBEST_{M+L}$ of the identified group $PG_M$ is better than the current local best value $LBEST_M$, the network evolver 202 in step 330 updates the local best value $LBEST_M$ and the local best position $LBESTX_M$ for the identified particle group $PG_M$. More specifically, the network evolver 202 sets the local best value $LBEST_M$ equal to the best, personal best value $PBEST_B$ of the identified group $PG_M$. Moreover, the network evolver 202 sets the local best position $LBEST_M$ equal to the personal best position $PBESTX_B$ associated with the best, personal best value $PBEST_B$ of the identified group $PG_M$.

It should be noted that in an exemplary embodiment, the local best values $LBEST_x$ are initially set to poor values so that the network evolver 202 during the first iteration through the network evolution method 300 (i.e. iteration counter ITER equal to 1) will update the local best values $LBEST_x$ with one of the personal best values $PBEST_{M-L}, \ldots PBEST_{M-1}, PBEST_M, PBEST_{M+1}, \ldots PBEST_{M+L}$ of its respective particle group $PG_x$. In another exemplary embodiment, the network evolver 202 during the first iteration through the network evolution method 300 sets each $LBEST_x$ of a particle $P_x$ equal to its respective personal best value $PBEST_x$ in step 320. Under either exemplary embodiment, each local best value $LBEST_x$ should be equal to the best, personal best value $PBEST_{x-L}, \ldots PBEST_{x-1}$, $PBEST_x, PBEST_{x+1}, \ldots PBEST_{x+L}$ of its respective particle group $PG_x$ after the first iteration through the network evolution method 300.

In step 332, the network evolver 202 determines whether all of the particle groups $PG_1, PG_2, \ldots PG_{P\#}$ have been processed. If all of the particle groups $PG_1, PG_2, \ldots PG_{P\#}$ have been processed, then the network evolver 202 proceeds to step 336 in order to determine whether termination criteria have been satisfied. However, if all of the particle groups $PG_1, PG_2, \ldots PG_{P\#}$ have not been processed, then the network evolver 202 proceeds to step 334. In an exemplary embodiment, the network evolver 202 determines that all of the particle groups $PG_1, PG_2, \ldots PG_{P\#}$ have been processed if the particle group index M is greater than the number of particle P# of the swarm S.

In step 334, the network evolver 202 updates the particle group index M and returns to step 328 in order to process the next particle group $PG_M$. In an exemplary embodiment, the network evolver 202 updates the particle group index M by incrementing the particle group index M by a value of 1.

After processing all of the particle groups $PG_1, PG_2, \ldots PG_{P\#}$, the network evolver 202 in step 336 determines whether defined termination criteria have been satisfied. If the network evolver 202 determines that the defined termination criteria have been satisfied, then the network evolver 202 proceeds to step 344 in order define the weighted connections matrix W, the weighted connections matrix U, the slope vector A, and the slope vector B. However, if the network evolver 202 determines that the defined termination criteria have not been satisfied, then the network evolver 202 proceeds to step 338 in order to update the velocity vectors $V_1, V_2, \ldots V_{P\#}$ associated with the particles $P_1, P_2, \ldots P_{P\#}$.

In an exemplary embodiment of the present invention, the termination criteria are defined by a maximum number of iterations $ITER_{MAX}$ and an error cutoff $E_{CUT}$. More specifically, the network evolver 202 in an exemplary embodiment determines to terminate the network evolution method 300 in response to (i) the iteration counter ITER having a predetermined relationship to the maximum number of iterations $ITER_{MAX}$, or (ii) the best of the local best values $LBEST_1, LBEST_2, \ldots LBEST_{P\#}$ having a predetermined relationship to the desired error cutoff $E_{CUT}$. For example, in an exemplary embodiment which attempts to minimize the fitness values $FV_x$, the network evolver 202 may be implemented to terminate the network evolution method 300 if either (i) the iteration counter ITER is equal to the maximum number of iterations $ITER_{MAX}$, or (ii) the best of the local best values $LBEST_1, LBEST_2, \ldots LBEST_{P\#}$ is less than the desired error cutoff $E_{CUT}$.

In step 338, the network evolver 202 updates the velocity vector $V_x$ for each particle $P_x$ of the swarm S. More specifically, the network evolver 202 updates the velocity vector $V_x$ of a particle $P_x$ based upon (i) an inertia weight wi, (ii) the personal best position $PBESTX_x$ of the particle $P_x$, and (iii) the local best position $LBESTX_x$ for the particle group $PG_x$ to which the particle $P_x$ belongs. In an exemplary embodiment, the network evolver 202 updates each velocity component $v_{x1}, v_{x2}, \ldots v_{xD}$ of the velocity vector $V_x$ for a particle $P_x$ based upon the following velocity equation (9):

$$v_{xd}' = wi*v_{xd} + c_1*\text{rand}(\ )*(pbestx_{xd} - pos_{xd}) + c_2*\text{Rand}(\ )*(lbestx_{xd} - pos_{xd}) \quad (9)$$

In the above velocity equation (9), $v_{xd}'$ represents an updated velocity component of the velocity vector $V_x$ in the $d^{th}$ dimension, $v_{xd}$ represents the current velocity component of the velocity vector $V_x$ in the $d^{th}$ dimension, wi represents the inertia weight parameter, and $c_1$ and $c_2$ represent acceleration constants. Moreover, rand( ) and Rand( ) represent random functions that each generate a random number in the range between 0 and 1. Furthermore, $pos_{xd}$ represents the position of the particle $P_x$ in the $d^{th}$ dimension, $pbestx_{xd}$ represents the position of the personal best value $PBEST_x$ in the $d^{th}$ dimension, and $lbestx_{xd}$ represents the position of the local best value $LBEST_x$ in the $d^{th}$ dimension.

The inertia weight parameter wi and the acceleration constants $c_1$ and $c_2$ may be used to control the tension in the system. Lower values (less than 1) for $c_1$ and $c_2$ tend to restrict particles $P_x$ to roam farther from their respective personal best values $PBEST_x$ and local best values $LBEST_x$, whereas higher values (greater than 1) for the acceleration constants $c_1$ and $c_2$ tend to allow particles $P_x$ to explore regions nearer their respective personal best values $PBEST_x$ and local best values $LBEST_x$. Similarly, high values for the inertia weight parameter wi tend to allow particles $P_x$ to roam farther from their respective personal best values $PBEST_x$ and local best values $LBEST_x$, whereas low values for the inertia weight parameter wi tend to restrict particles $P_x$ to regions nearer their respective personal best values $PBEST_x$ and local best values $LBEST_x$.

In an exemplary embodiment of the present invention, the network evolver 202 sets the acceleration constants equal to a value of 2. Moreover, the network evolver 202 decreases the inertia weight wi linearly over the defined maximum iterations $ITER_{MAX}$ from the initial inertia weight $wi_0$ to a final inertia weight such as 0.4. The advantage of adjusting the inertia weight wi from a high value of 0.9 to a low value of 0.4 is that the particles $P_1, P_2, \ldots P_{P\#}$ initially perform a more global exploration and move gradually toward a more local exploration.

Moreover, in an exemplary embodiment, the network evolver 202 clips the updated velocity components $v_{x1}', v_{x2}', \ldots v_{xD}'$ such that no updated velocity component $v_{xd}'$ is greater than the maximum velocity parameter $V_{MAX}$. For example, if the network evolver 202 obtains an updated velocity component $v_{xd}'$ equal to 11.3 and the maximum velocity parameter $V_{MAX}$ is set to 10.0, then the network evolver 202 would set the updated velocity component $v_{xd}'$ equal to 10.0 instead of 11.3.

After updating the velocity vector $V_x$ for each particle $P_x$ of the particle swarm S, the network evolver 202 in step 340 updates each position $POS_x$ of each particle $P_x$. In particular, the network evolver 202 updates each position component $pos_{x1}, pos_{x2}, \ldots pos_{xD}$ of each position $POS_x$ based upon the updated velocity vector $V_x$ for corresponding particle $P_x$. To this end, the network evolver 202 in an exemplary embodiment updates each position component $pos_{x1}, pos_{x2}, \ldots pos_{xD}$ of a particle position $POS_x$ based upon the following position equation (10).

$$pos_{xd}' = pos_{xd} + v_{xd}' \quad (10)$$

where $pos_{xd}$ represents the current position component of the particle position $POS_x$ in the $d^{th}$ dimension, $pos_{xd}'$ represents the updated position component of the particle position $POS_x$ in the $d^{th}$ dimension, and $v_{xd}'$ represents the updated velocity component for the particle $P_x$ in the $d^{th}$ dimension. Moreover, in an exemplary embodiment, the network evolver 202 clips the updated position components $pos_{x1}', pos_{x2}', \ldots pos_{xD}'$ such that no updated position component $pos_{xd}'$ is greater than the maximum position parameter $POS_{MAX}$. For example, if the network evolver 202 obtains an updated position component $pos_{xd}'$ equal to −11.3 and the maximum position parameter $POS_{MAX}$ is set to 10.0, then the network evolver 202 would set the updated position component $pos_{xd}'$ equal to −10.0 instead of −11.3. However, it should be appreciated that the network evolver 202 may also be implemented such that the updated positions components $pos_{x1}', pos_{x2}', \ldots pos_{xD}'$ are not limited to a specified range.

In step 342, the network evolver 202 updates the iteration counter ITER and returns to step 310 in order to process the updated particles $P_1, P_2, \ldots P_{P\#}$ of the particle swarm S. In particular, the network evolver 202 in an exemplary embodiment increments the iteration counter ITER by a value of 1 before returning to step 310.

After the termination criteria are satisfied, the network evolver 202 in step 344 obtains a neural network definition for the neural network 100 from the particle swarm S. More specifically, the network evolver 202 obtains the position in the D-dimensional hyperspace that achieved that best fitness value and uses this position to define the weighted connections matrix W, the weighted connections matrix U, the slope matrix A, and the slope matrix B of the neural network 100. To this end, the network evolver 202 in an exemplary embodiment (i) obtains the best, personal best position $PBESTX_B$ associated with the best of the personal best values $PBEST_1, PBEST_2, \ldots PBEST_{P\#}$, (ii) sets each weighted connection $w_{hi}$ of the weighted connections matrix W, each weighted connection $u_{ij}$ of the weighted connections matrix U, each slope factor $\alpha$ of the slope factor A, and each slope factor $\beta$ of the slope vector B equal to a respective position component $pbestx_{B1}, pbestx_{B2}, \ldots pbest_{BD}$ of the best, personal best position $PBESTX_B$.

Similarly, in another exemplary embodiment, the network evolver 202 (i) obtains the best, local best position $LBESTX_B$ associated with the best of the local best values $LBEST_1, LBEST_2, \ldots LBEST_{P\#}$, (ii) sets each weighted connection $w_{hi}$ of the weighted connections matrix W, each weighted connection $u_{ij}$ of the weighted connection matrix U, each slope factor $\alpha$ of the slope factor A, and each slope factor $\beta$ of the slope vector B equal to a respective position component $lbestx_{B1}, lbestx_{B2}, \ldots lbest_{BD}$ of the best, local best position $PBESTX_B$. It should be appreciated that either of the two exemplary embodiments should achieve the same results for the weighted connections matrix W, the weighted connections matrix U, the slope vector A, and the slope vector B.

Exemplary Network Simplification Method

Figure 4:
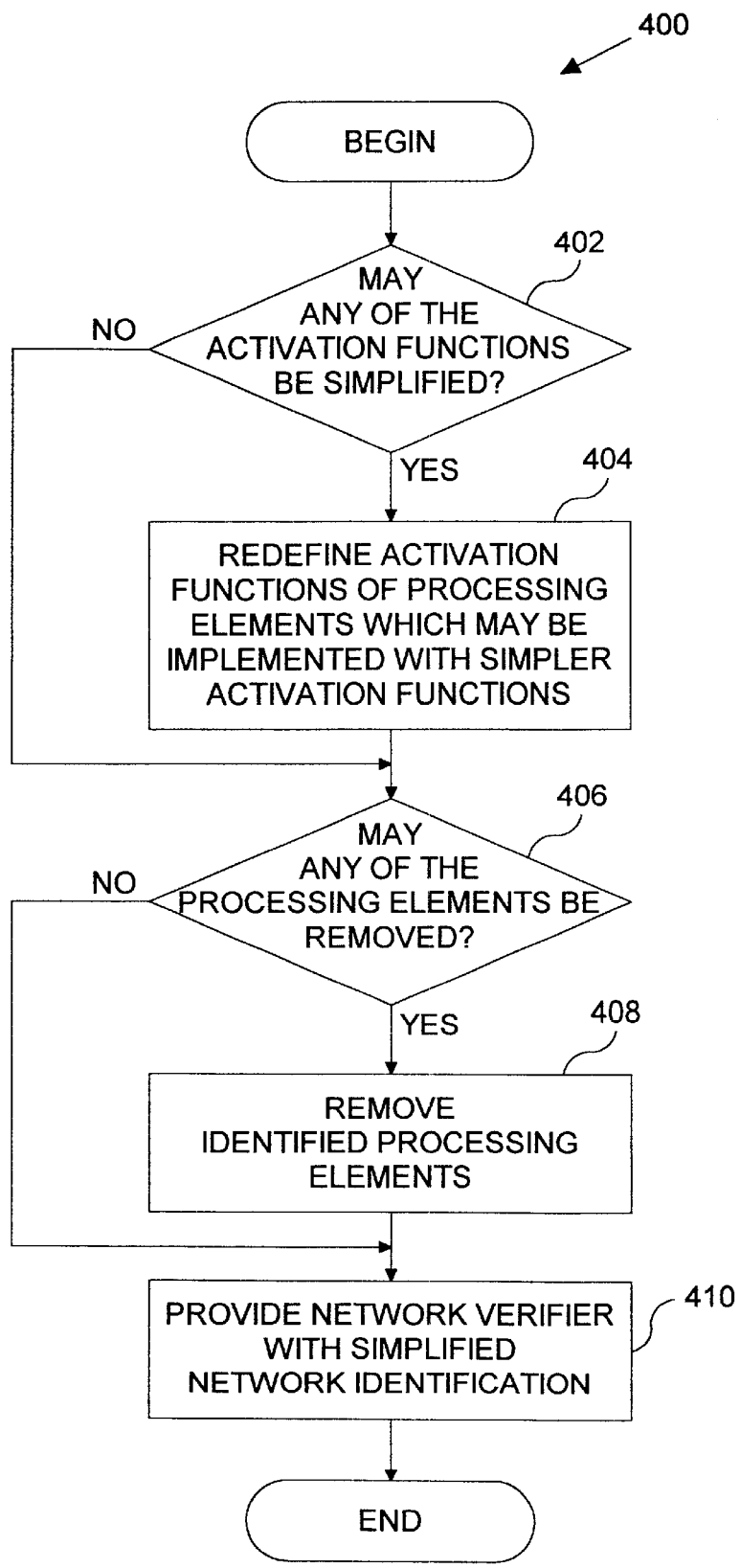
FIG. 4 shows a flowchart of a network simplification method implemented by the exemplary network evolution system of FIG. 2.

Referring now to FIG. 4, there is illustrated a flowchart of an network simplification method 400. In general, the network simplification method 400 when executed by the network simplifier 204 causes the network simplifier 204 to simplify a definition for the neural network 100 in order to obtain a less complex definition of the neural network 100. More specifically, the network simplifier 204 in implementing the network simplification method 400 generally (i) removes unnecessary processing elements from the neural network 100, and/or (ii) replaces complex activation functions of certain processing elements with less computationally complex activation functions.

To this end, the network simplifier 204 in step 402 determines based upon the slope vector A and the slope vector B whether any of the activation functions of the hidden processing elements $PEy_1, PEy_2, \ldots PEy_q$ or the output processing elements $PEz_1, PEz_2, \ldots PEz_p$ may be simplified. In an exemplary embodiment, each hidden processing element $PEy_i$ is initially implemented with the sigmoid threshold function of equation (3) and each output processing element $PEz_j$ is initially implemented with the sigmoid threshold function of equation (6). As can be seen from equations (3) and (6), if the slope factors $\alpha$ and $\beta$ are positive and have a sufficiently large magnitude, the sigmoid activation function essentially becomes the following step threshold function (11):

$$f(x) = \begin{cases} 1 & \text{if } x \geq 0 \\ 0 & \text{if } x < 0 \end{cases} \tag{11}$$

Similarly, if the slope factors $\alpha$ and $\beta$ are negative and have a sufficiently large magnitude, the sigmoid threshold function essentially becomes the following step threshold function (12):

$$f(x) = \begin{cases} 1 & \text{if } x \leq 0 \\ 0 & \text{if } x > 0 \end{cases} \tag{12}$$

As a result of the above properties of the sigmoid threshold function, the network simplifier 204 in an exemplary embodiment determines that activation functions of the neural network 100 may be simplified if any of the slope factors $\alpha$ and $\beta$ of the slope vectors A and B has a magnitude greater than a slope upper limit $SLOPE_{ULIM}$. It has been found that a slope upper limit $SLOPE_{ULIM}$ as small as 10 often results in a simplified neural network 100 with minimal effect on the accuracy of the output patterns $Z_k$ generated by the neural network 100.

In step 404, the network simplifier 204 redefines the activation functions for those processing elements PE which may be implemented with a simpler activation function. In particular, for each hidden processing element $PEy_i$ with a positive slope factor $\alpha_i$ having a magnitude greater than the slope upper limit $SLOPE_{ULIM}$, the network simplifier 204 in an exemplary embodiment replaces the sigmoid threshold function of the hidden processing element $PEy_i$ with the step threshold function of equation (11). Moreover, for each hidden processing element $PEy_i$ with a negative slope factor $\alpha_i$ having a magnitude greater than the slope upper limit $SLOPE_{ULIM}$, the network simplifier 204 replaces the sigmoid threshold function of the hidden processing element $PEy_i$ with the step threshold function of equation (12). Similarly, for each output processing element $PEz_j$ with a positive slope factor $\beta_j$ having a magnitude greater than the slope upper limit $SLOPE_{ULIM}$, the network simplifier 204 in an exemplary embodiment replaces the sigmoid threshold function of the output processing element $PEz_j$ with the step threshold function of equation (11). Moreover, for each output processing element $PEz_j$ with a negative slope factor $\beta_j$ having a magnitude greater than the slope upper limit $SLOPE_{ULIM}$, the network simplifier 204 replaces the sigmoid threshold function of the output processing element $PEz_j$ with the step threshold function of equation (12).

The network simplifier 204 then in step 406 determines whether any of the hidden processing elements $PEy_1, PEy_2, \ldots PEy_q$ may be removed from the neural network 100. If the network simplifier 204 determines that at least one of the hidden processing elements $PEy_1, PEy_2, \ldots PEy_q$ may be removed from the neural network 100, then the network simplifier 204 proceeds to step 408. However, if the network simplifier 204 determines that none of the hidden processing elements $PEy_1, PEy_2, \ldots PEy_q$ may be removed from the neural network 100, then the network simplifier proceeds to step 410.

As stated above, each hidden processing elements $PEy_i$, of the neural network 100 in an exemplary embodiment is initially implemented with the sigmoid threshold function of equation (3). As can be seen from the sigmoid threshold function of equation (3), the output of the sigmoid threshold function is roughly equal to a constant value of 0.5 when the magnitude of the slope factor $\alpha$ is less than a slope lower limit $SLOPE_{LLIM}$. Accordingly, the network simplifier 204 in an exemplary embodiment determines that a hidden processing element $PEy_i$ may be removed from the neural network 100 if the slope factor $\alpha_i$ associated with the hidden processing element $PEy_i$ is less than the slope lower limit $SLOPE_{LLIM}$. Appropriate values for the slope lower limit $SLOPE_{LLIM}$ are dependent upon the application; however, the network simplifier 204 in an exemplary embodiment uses a lower slope limit $SLOPEL_{LIM}$ of 0.1 which may be sufficient for many different types of applications.

In step 408, the network simplifier 204 removes those hidden processing elements $PEy_i$ identified in step 406 as being appropriate for removal. To this end, for each hidden processing element $PEy_i$ with a slope factor $\alpha_i$ having a magnitude less than the slope lower limit $SLOPE_{LLIM}$, the network simplifier 204 (i) removes the identified hidden processing element $PEy_i$, (ii) removes the weighted connections vector $W_i$ from the weighted connections matrix W associated with the removed hidden processing element $PEy_i$, (iii) updates the biasing weight connections $u_{10}$, $u_{20}$, ... $u_{p0}$ in order to replicate the function of the removed hidden processing element $PEy_i$, and (iv) removes the weighted components $u_{1i}$, $u_{2i}$, ... $u_{pi}$ from the weighted connections matrix U associated with the removed hidden processing element $PEy_i$.

Figure 5:
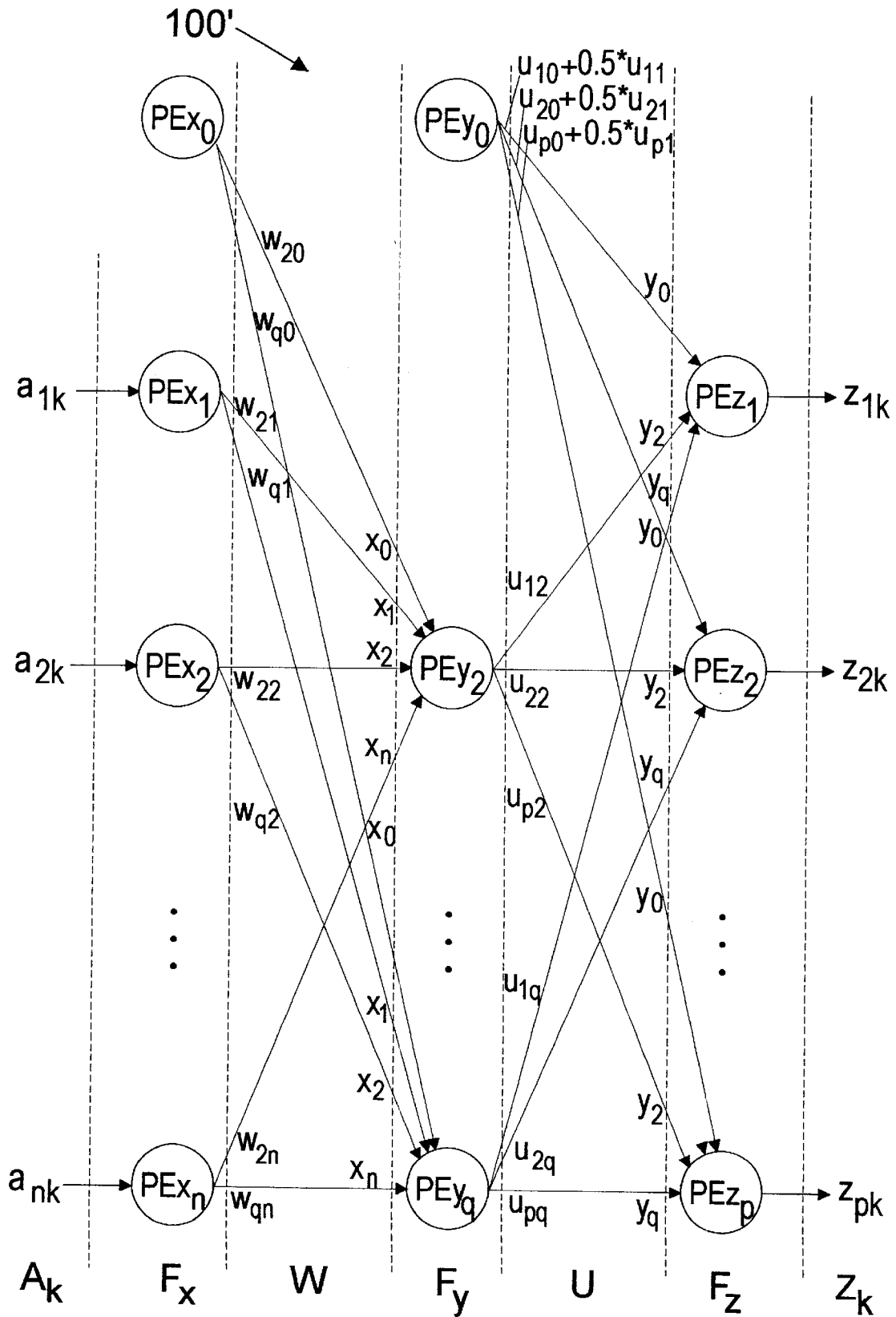
FIG. 5 illustrates the manner by which the network simplification method of FIG. 4 removes a processing element of the exemplary neural network of FIG. 1.

More specifically, since the removed hidden processing element $PEy_i$ essentially generated a constant output signal $y_i$ of 0.5, the removed hidden processing $PEy_i$ essentially affected each of the output processing elements $PEz_1$, $PEz_2$, ... $PEz_p$ by an amount of 0.5 times the respective weighted connections $u_{1i}$, $u_{2i}$, ... $u_{pi}$. Accordingly, the network simplifier 204 in an exemplary embodiment replicates the effect of the removed hidden processing element $PEy_i$ by increasing the biasing weighted connections $u_{10}$, $u_{20}$, ... $u_{p0}$ from the biasing processing element $PEy_0$ by 0.5 times the removed weight connections $u_{1i}$, $u_{2i}$, ... $u_{pi}$. The following equation (13) represents this update of the biasing weight connections $u_{10}$, $u_{20}$, ... $u_{p0}$:

$$u_{k0}' = u_{k0} + 0.5 * u_{ki} \quad (13)$$

where $u_{k0}'$ represents the updated $k^{th}$ weighted connection from the biasing processing element $PEy_0$, $u_{k0}$ represents the current $k^{th}$ weighted connection from the biasing processing element $PEy_0$, and $u_{ki}$ represents the $k^{th}$ weighted connection associated with the removed hidden processing element $PEy_i$. For example, FIG. 5 illustrates a simplified neural network 100' in which the hidden processing element $PEy_1$ has been removed from the neural network 100 of FIG. 1, and the biasing weighted connections $u_{10}$, $u_{20}$, ... $u_{p0}$ have been updated to replicate the effect of the removed hidden processing element $PEy_1$.

In step 410, the network simplifier 204 transfers the simplified definition of the neural network 100 to the network verifier 206. In particular, the network simplifier 204 transfers the obtained weighted connections matrix W, the weighted connections matrix U, the slope vector A, and the slope vector B to the network verifier 206. The network verifier 206 may then test the obtained simplified definition for the neural network 100 by applying test input patterns $A_k$ of the test pattern set $TEST_{SET}$, and calculating a fitness value for the simplified definition based upon generated output patterns $Z_k$ and expected output patterns $B_k$ of the test pattern set $TEST_{SET}$.

Exemplary Implementations Of Neural Networks And Network Evolution Systems

It should be appreciated by those skilled in the art that the neural network 100 and/or the network evolution system 200 may be implemented with various hardware components such a digital signal processors, digital logic components, and analog components. Moreover, it should be appreciated that the neural network 100 and/or the network evolution system 200 may be implemented with properly programmed general purpose computer systems, multiprocessor computer systems, and distributed clusters of computer systems.

Figure 6:
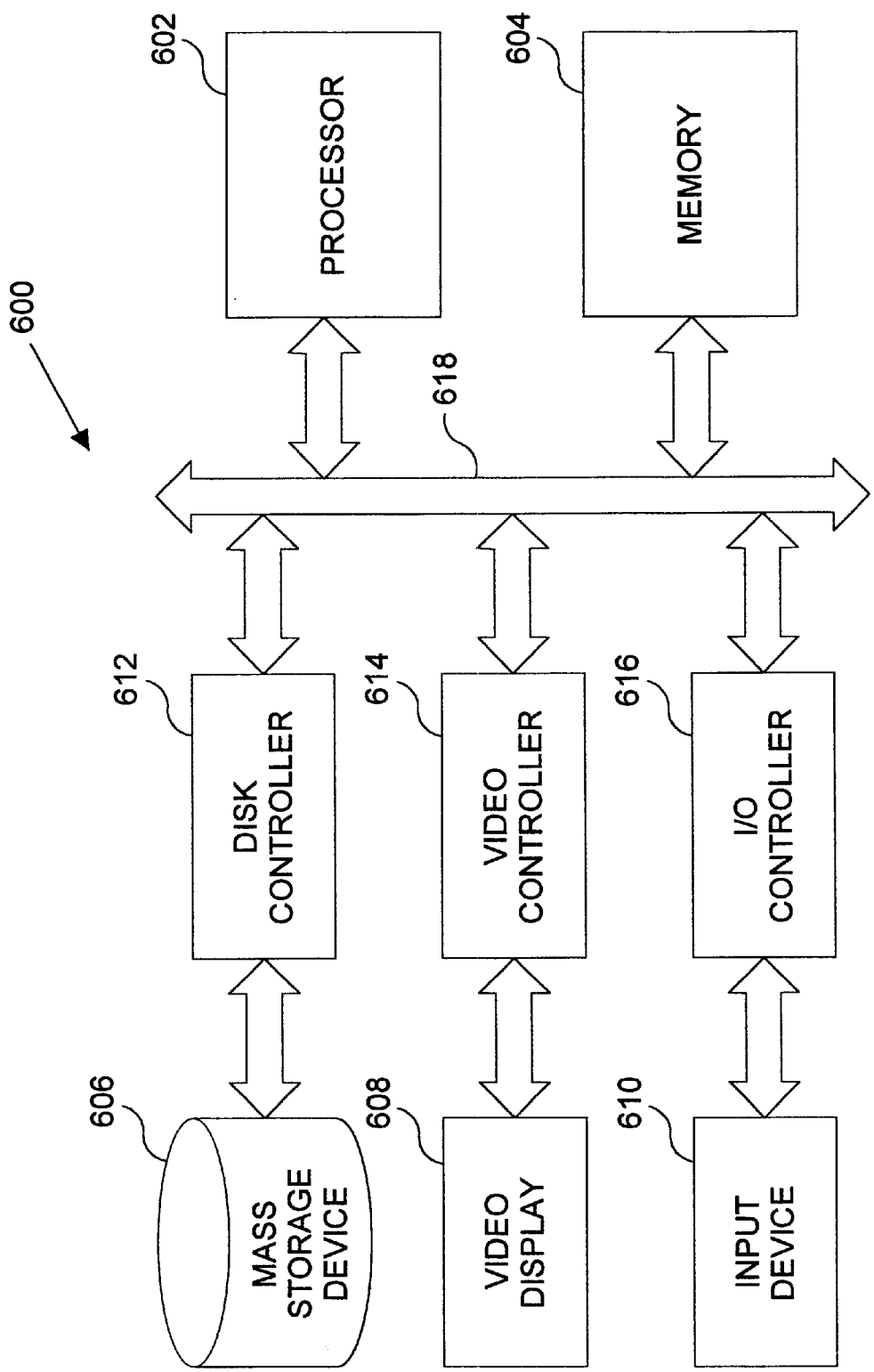
FIG. 6 shows a block diagram of a general purpose computer system which is suitable for implementing the exemplary neural network of FIG. 1 and the network evolution system of FIG. 2.

For example, FIG. 6 illustrates a general processing system 600 which is suitable for implementing the neural network 100 and network evolution system 200 of the present invention. In particular, the general processing system 600 includes a processor 602, memory 604, mass storage device 606, video display 608, and input device 610. Moreover, the general processing system 600 includes a mass storage controller 612 for controlling the mass storage device 606, a video controller 614 for controlling the video display 608, an I/O controller 616 for controlling the input device 610, and a system bus 618. The system bus 618 operably couples the processor 602 to the memory 604, the mass storage controller 612, the video controller 614, and the I/O controller 616.

The memory 604 includes random access memory (RAM) such as SRAM (static RAM), DRAM (dynamic RAM), and SDRAM (synchronous DRAM) which store software routines obtained from computer readable media such as a floppy disk, CD-ROM disc, DVD disc, and hard disks. The memory 604 may also include nonvolatile computer readable media such as PROM (programmable read only memory), EPROM (electrically PROM), EEPROM (electrically erasable PROM), and flash memory that store software routines.

The processor 602 is operable to execute the software and/or firmware routines stored in the memory 604, and communicate with the mass storage device 606, the video display 608, and the input device 610 via the mass storage controller 612, the video controller 614, and the I/O controller 616 respectively. Most importantly, the processor 602 is operable to execute software and/or firmware routines of the memory 604 which cause the processor 602 to implement the network evolution system 200 of FIG. 2.

It should be appreciated by those skilled in the art that since the slope factors $\alpha$ and $\beta$ may become arbitrarily large and the input signal $a_{1k}$, $a_{2k}$, and $a_{nk}$ may be arbitrarily large precautions must be taken with a computer system implementation of the neural network 100 and/or the network evolution system 200 to ensure against overflow and underflow errors. For example, in an exemplary computer system embodiment of the present invention, the computer system 600 in calculating the sigmoid activation function of equations (3) and (6) first test to see if the product of the slope factor $\alpha$ or $\beta$ and the resulting combinatory value c is greater than a threshold number such as 90. If the product is greater than 90, then the computer system 600 generates a value of 0 for the result of the sigmoid activation function instead of performing the rest of the sigmoid activation calculation. This threshold test insures that the computer system 600 will not encounter an overflow or underflow error due to computational limits inherent to digital computations.

Alternative Threshold Functions And Simplifications

It should be appreciated by those skilled in the art that the above exemplary network evolution system 200 may be used to train neural networks having processing elements that utilize different activation functions. For example, the above exemplary network evolution system 200 may be used to evolve and simplify neural networks that utilize the threshold functions of the TABLE 1. More specifically, the network simplifier 206 may replace a processing element threshold function with the simpler threshold function if the slope factor a of the processing element meets the criteria of the TABLE 1. Moreover, the network simplifier 206 may remove hidden layer processing elements of the neural network 100 if the simplified threshold function generates a constant output.

TABLE 1

| Function Name | Function | Simplification |
|---|---|---|
| Hyperbolic tangent | $f(x) = \tanh(\alpha x) = \dfrac{e^{\alpha x} - e^{-\alpha x}}{e^{\alpha x} + e^{-\alpha x}}$ | For small $\alpha$, $f(x) = 0$ <br> for large positive $\alpha$, $f(x) = \begin{cases} 1 & \text{if } x \geq 0 \\ -1 & \text{if } x < 0 \end{cases}$ <br> for large positive $\alpha$, $f(x) = \begin{cases} 1 & \text{if } x \geq 0 \\ -1 & \text{if } x < 0 \end{cases}$ |
| Hyperbolic secant | $f(x) = \text{sech}(\alpha x) = \dfrac{2}{e^{\alpha x} + e^{-\alpha x}}$ | For small $\alpha$, $f(x) = 1$ <br> for large $\alpha$, $f(x) = 0$ |
| Gaussian Function, or Radial Basis Function | $f(x) = e^{(-x/\alpha)^2}$ | For small $\alpha$, $f(x) = 0$ <br> for large $\alpha$, $f(x) = 1$ |
| Augmented Ratio of Squares | $f(x) = \begin{cases} \dfrac{\alpha x^2}{1+\alpha x^2} & \text{if } x > 0 \\ 0 & \text{if } x \leq 0 \end{cases}$ | For small $\alpha$, $f(x) = 0$ <br> for large $\alpha$, $f(x) = \begin{cases} 1 & \text{if } x > 0 \\ 0 & \text{if } x \leq 0 \end{cases}$ |

While the invention has been illustrated and described in detail in the drawings and foregoing description, such illustration and description is to be considered as exemplary and not restrictive in character, it being understood that only the exemplary embodiments have been shown and described and that all changes and modifications that come within the spirit of the invention are desired to be protected.

What is claimed is:

1. A method of evolving a neural network comprising a plurality of processing elements interconnected by a plurality of weighted connections, comprising the steps of:
   a) obtaining a definition for said neural network by evolving a plurality of weights for said plurality of weighted connections, and evolving a plurality of activation function parameters associated with said plurality of processing elements,
   b) determining, based upon a first activation function parameter of said plurality of activation function parameters, whether a first processing element of said plurality of processing elements may be removed from said neural network to simplify the definition for said neural network, and
   c) updating said definition for said neural network by removing said first processing element from said definition of said neural network in response to determining that said first processing element may be removed.

2. A method of evolving a neural network comprising a plurality of processing elements interconnected by a plurality of weighted connections, comprising the steps of:
   a) obtaining a definition for said neural network by evolving a plurality of weights for said plurality of weighted connections, and evolving a plurality of activation function parameters associated with said plurality of processing elements,
   b) determining whether said definition for said neural network may be simplified by determining whether a first slope factor of said plurality of activation function parameters has a predetermined relationship to a slope threshold, and
   c) updating said definition for said neural network by removing a first processing element implementing a sigmoid activation function from said definition of said neural network in response to determining that said first slope factor has said predetermined relationship to said slope threshold.

3. The method of claim 1, wherein:
   step b) further comprises the step of determining that a first processing element of said plurality of processing elements substantially generates a substantially constant output signal regardless of received input signals based upon a first slope factor of a said plurality of activation functions parameters that is associated with a first activation function implemented by said first processing element; and
   step c) further comprises the steps of:
   c1) removing said first processing element from said definition of said neural network in response to determining that said first processing element generates said substantially constant output signal, and
   c2) updating biasing weighted connections of said plurality of weighted connections associated with a biasing processing element of said plurality of processing elements based upon first weighted connections of said plurality of weighted connections associated with said first processing element in order to substantially reproduce an effect said first processing element had on said plurality of processing elements prior to said first processing element being removed from said definition of said neural network.

4. A method of evolving a neural network comprising a plurality of processing elements interconnected by a plurality of weighted connections, comprising the steps of:
   a) obtaining a definition for said neural network by evolving a plurality of weights for said plurality of weighted connections, and evolving a plurality of activation function parameters associated with said plurality of processing elements, said obtaining the definition for said neural network further comprising
   a1) initializing a swarm of particles in which each particle has a position in a hyperspace that represents a separate definition for said neural network, and a velocity vector that represents motion of said particle through said hyperspace,
   a2) determining for each particle of said swarm, a fitness value for said respective definition of said neural network,
   a3) determining based upon said fitness values whether termination criteria have been satisfied,
   a4) updating for said each particle of said swarm, a personal best value and a personal best position based upon said respective fitness value for said each particle,
   a5) updating for said each particle of said swarm, a local best value and a local best position based upon fitness values associated with a respective group of said particles,
   a6) updating for said each particle of said swarm, said position and said velocity vector for said particle based upon said personal best position for said particle, said local best position for said particle, and said velocity vector for said particle, and a7) repeating steps a2), a3), a4), a5), and a6) until said termination criteria have been satisfied;

b) determining whether said definition for said neural network may be simplified based upon at least one activation function parameter of said plurality of activation function parameters; and c) updating said definition for said neural network in response to determining that said definition for said neural network may be simplified.

5. The method of claim 4, wherein step a6) comprises the step of:

updating said each particle of said swarm such that said velocity vector has more effect on early updates of said each particle than said velocity vector has on later updates of said each particle.

6. A computer readable medium for evolving a neural network comprising a plurality of processing elements interconnected by a plurality of weighted connections, said computer readable medium comprising code which when executed by a network evolution system causes said network evolution system to:

obtain a definition for said neural network by evolving a plurality of weights for said plurality of weighted connections, and evolving a plurality of activation function parameters associated with said plurality of processing elements;

determine whether said definition for said neural network may be simplified based upon at least one activation function parameter of said plurality of activation function parameters; and update said definition for said neural network in response to determining that said definition for said neural network may be simplified.

7. The computer readable medium of claim 6, wherein said code when executed by said network evolution system further causes said network evolution system to:

determine whether said definition for said neural network may be simplified by determining, based upon a first activation function parameter of said plurality of activation parameters, whether a first activation function of a first processing element of said plurality of processing elements may be implemented with a less complex activation function, and update said definition for said neural network by replacing said first activation function with said less complex activation function in response to determining that said first activation function may be implemented with said less complex activation function.

8. The computer readable medium of claim 6, wherein said code when executed by said network evolution system further causes said network evolution system to:

determine whether said definition for said neural network may be simplified by determining whether a first slope factor of said plurality of activation function parameters has a predetermined relationship to a slope threshold, and update said definition for said neural network by replacing a sigmoid activation function of a first processing element with a step activation function in response to determining that said first slope factor has said predetermined relationship to said slope threshold.

9. The computer readable medium of claim 6, wherein said code when executed by said network evolution system further causes said network evolution system to:

determine whether said definition for said neural network may be simplified by determining, based upon a first activation function parameter of said plurality of activation parameters, whether a first processing element of said plurality of processing elements may be removed from said neural network, and update said definition for said neural network by removing said first processing element from said definition of said neural network in response to determining that said first processing element may be removed.

10. The computer readable medium of claim 6, wherein said code when executed by said network evolution system further causes said network evolution system to:

determine whether said definition for said neural network may be simplified by determining whether a first slope factor of said plurality of activation function parameters has a predetermined relationship to a slope threshold, and update said definition for said neural network by removing a first processing element implementing a sigmoid activation function from said definition of said neural network in response to determining that said first slope factor has said predetermined relationship to said slope threshold.

11. The computer readable medium of claim 6, wherein said code when executed by said network evolution system further causes said network evolution system to:

determine whether said definition for said neural network may be simplified by determining that a first processing element of said plurality of processing elements substantially generates a substantially constant output signal regardless of received input signals based upon a first slope factor of a said plurality of activation functions parameters that is associated with a first activation function implemented by said first processing element; and update said definition for said neural network by (i) removing said first processing element from said definition of said neural network in response to determining that said first processing element generates said substantially constant output signal, and (ii) updating biasing weighted connections of said plurality of weighted connections associated with a biasing processing element of said plurality of processing elements based upon first weighted connections of said plurality of weighted connections associated with said first processing element in order to substantially reproduce an effect said first processing element had on said plurality of processing elements prior to said first processing element being removed from said definition of said neural network.

12. The computer readable medium of claim 6, wherein said code when executed by said network evolution system further causes said network evolution system to obtain a definition for said neural network by:

a) initializing a swarm of particles in which each particle has a position in a hyperspace that represents a separate definition for said neural network, and a velocity vector that represents motion of said particle through said hyperspace;

b) determining for each particle of said swarm, a fitness value for said respective definition of said neural network;

c) determining based upon said fitness values whether termination criteria have been satisfied;

d) updating for said each particle of said swarm, a personal best value and a personal best position based upon said respective fitness value for said each particle;

e) updating for said each particle of said swarm, a local best value and a local best position based upon fitness values associated with a respective group of said particles;

f) updating for said each particle of said swarm, said position and said velocity vector for said particle based upon said personal best position for said particle, said local best position for said particle, and said velocity vector for said particle; and g) repeating b), c), d), e), and f) until said termination criteria have been satisfied.

13. The computer readable medium of claim 12, wherein said code when executed by said network evolution system further causes said network evolution system to update said position and said velocity vector for said each particle of said swarm by:

updating said each particle of said swarm such that said velocity vector has more effect on early updates of said each particle than said velocity vector has on later updates of said each particle.

14. A network evolution system for evolving a neural network comprising a plurality of processing elements interconnected by a plurality of weighted connections, said network evolution system comprising:

a network evolver operable to obtain a definition for said neural network by evolving a plurality of weights for said plurality of weighted connections, and evolving a plurality of activation function parameters associated with said plurality of processing elements; and a network simplifier operable to (i) determine whether said definition for said neural network may be simplified based upon at least one activation function parameter of said plurality of activation function parameters, and (ii) update said definition for said neural network in response to determining that said definition for said neural network may be simplified.

15. The network evolution system of claim 14, wherein said network simplifier is further operable to:

determine whether said definition for said neural network may be simplified by determining, based upon a first activation function parameter of said plurality of activation parameters, whether a first activation function of a first processing element of said plurality of processing elements may be implemented with a less complex activation function, and update said definition of said neural network by replacing said first activation function with said less complex activation function in response to determining that said first activation function may be implemented with said less complex activation function.

16. The network evolution system of claim 14, wherein said network simplifier is further operable to:

determine whether said definition for said neural network may be simplified by determining whether a first slope factor of said plurality of activation function parameters has a predetermined relationship to a slope threshold, and update said definition of said neural network by replacing a sigmoid activation function of a first processing element with a step activation function in response to determining that said first slope factor has said predetermined relationship to said slope threshold.

17. The network evolution system of claim 14, wherein said network simplifier is further operable to:

determine whether said definition for said neural network may be simplified by determining, based upon a first activation function parameter of said plurality of activation parameters, whether a first processing element of said plurality of processing elements may be removed from said neural network, and update said definition of said neural network by removing said first processing element from said definition of said neural network in response to determining that said first processing element may be removed.

18. The network evolution system of claim 14, wherein said network simplifier is further operable to:

determine whether said definition for said neural network may be simplified by determining whether a first slope factor of said plurality of activation function parameters has a predetermined relationship to a slope threshold, and update said definition of said neural network by removing a first processing element implementing a sigmoid activation function from said definition of said neural network in response to determining that said first slope factor has said predetermined relationship to said slope threshold.

19. The network evolution system of claim 14, wherein said network simplifier is further operable to:

determine whether said definition for said neural network may be simplified by determining that a first processing element of said plurality of processing elements substantially generates a substantially constant output signal regardless of received input signals based upon a first slope factor of a said plurality of activation functions parameters that is associated with a first activation function implemented by said first processing element, and update said definition of said neural network by (i) removing said first processing element from said definition of said neural network in response to determining that said first processing element generates said substantially constant output signal, and (ii) updating biasing weighted connections of said plurality of weighted connections associated with a biasing processing element of said plurality of processing elements based upon first weighted connections of said plurality of weighted connections associated with said first processing element in order to substantially reproduce an effect said first processing element had on said plurality of processing elements prior to said first processing element being removed from said definition of said neural network.

20. The network evolution system of claim 14, wherein said network evolver is further operable to obtain said definition of said neural network by:

a) initializing a swarm of particles in which each particle has a position in a hyperspace that represents a separate definition for said neural network, and a velocity vector that represents motion of said particle through said hyperspace;

b) determining for each particle of said swarm, a fitness value for said respective definition of said neural network;

c) determining based upon said fitness values whether termination criteria have been satisfied;

d) updating for said each particle of said swarm, a personal best value and a personal best position based upon said respective fitness value for said each particle;

e) updating for said each particle of said swarm, a local best value and a local best position based upon fitness values associated with a respective group of said particles;

f) updating for said each particle of said swarm, said position and said velocity vector for said particle based upon said personal best position for said particle, said local best position for said particle, and said velocity vector for said particle; and g) repeating b), c), d), e), and f) until said termination criteria have been satisfied.

\* \* \* \* \*